United States Patent [19]

Silberman

[11] Patent Number: 5,381,575
[45] Date of Patent: Jan. 17, 1995

[54] BRIDGE DOCKING STRUCTURE FOR AIRCRAFT

[76] Inventor: Cyril J. Silberman, 4048 Lakeland Ave., N., Minneapolis, Minn. 55422

[21] Appl. No.: 786,760

[22] Filed: Nov. 1, 1991

Related U.S. Application Data

[63] Continuation-in-part of Ser. No. 640,982, Jan. 14, 1991.

[51] Int. Cl.6 .................... F01D 1/00; E04G 1/00
[52] U.S. Cl. ...................... 14/69.5; 182/130
[58] Field of Search .............. 14/69.5; 182/130, 131, 182/132, 141, 36, 117

[56] References Cited

U.S. PATENT DOCUMENTS

| | | |
|---|---|---|
| 1,718,979 | 7/1929 | Protzeller . |
| 2,406,786 | 8/1945 | Aukland . |
| 2,430,179 | 11/1947 | Lanchester . |
| 2,829,582 | 4/1958 | Abott et al. . |
| 2,978,754 | 4/1961 | Wilson . |
| 3,256,955 | 6/1966 | Izmirian et al. . |
| 3,451,504 | 6/1969 | Logan . |
| 3,602,335 | 8/1971 | Gustetic . |
| 3,670,849 | 6/1972 | Milner, Jr. . |
| 3,785,454 | 1/1974 | Behunin et al. . |
| 3,814,211 | 6/1974 | Pamer . |
| 3,831,709 | 8/1974 | Stanford et al. . |
| 3,927,732 | 12/1975 | Ooka et al. . |
| 4,060,148 | 11/1977 | Sidney . |
| 4,087,977 | 5/1978 | Kuhlman . |
| 4,154,318 | 5/1979 | Malleone . |
| 4,168,814 | 9/1979 | Bird . |
| 4,236,698 | 12/1980 | Compte . |
| 4,273,214 | 6/1981 | Grove . |
| 4,373,761 | 2/1983 | Hansberry, Jr. . |
| 4,646,877 | 3/1987 | Whan . |
| 4,657,111 | 4/1987 | Tremblay . |
| 4,759,437 | 7/1988 | Bevins . |
| 4,887,107 | 10/1989 | Anderson . |

FOREIGN PATENT DOCUMENTS

| | | |
|---|---|---|
| 2604141 | 8/1977 | Germany . |
| 2737418 | 1/1979 | Germany . |
| 521354 | 5/1940 | United Kingdom . |
| 476205 | 12/1975 | U.S.S.R. . |

Primary Examiner—James R. Brittain
Assistant Examiner—Nancy Connolly
Attorney, Agent, or Firm—Woodcock Washburn Kurtz Mackiewicz & Norris

[57] ABSTRACT

A system for servicing and maintaining an aircraft includes a fuselage dock assembly having a first ground-supported column, a second ground-supported column and a walkway section supported by the first and second columns. The system also includes a tail dock assembly having a recess defined therein for receiving a tail section of an aircraft, and an engine stand for servicing an engine of the aircraft that is not readily accessible from the fuselage dock assembly or the tail dock assembly. Structure is also provided for adjusting the height and inclination of the walkway section relative to a horizontal plane, so that the walkway section will conform to the natural inclination of a particular aircraft. The system includes several other novel and advantageous features for increasing the safety and efficiency of aircraft maintenance.

12 Claims, 24 Drawing Sheets

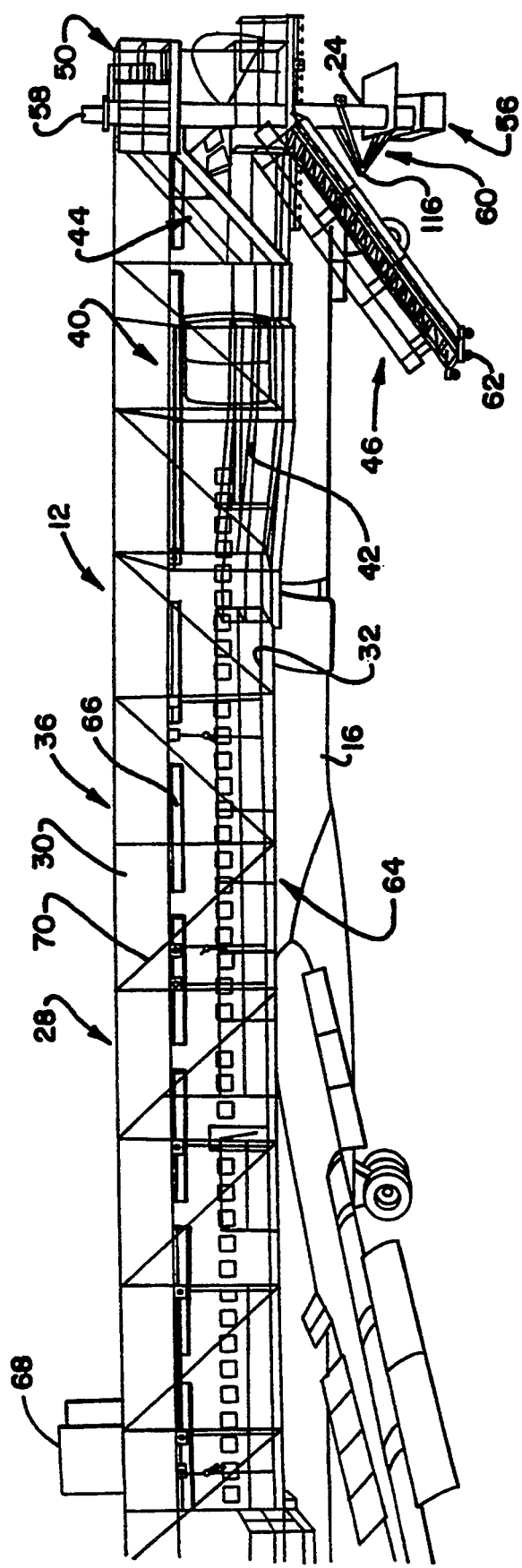

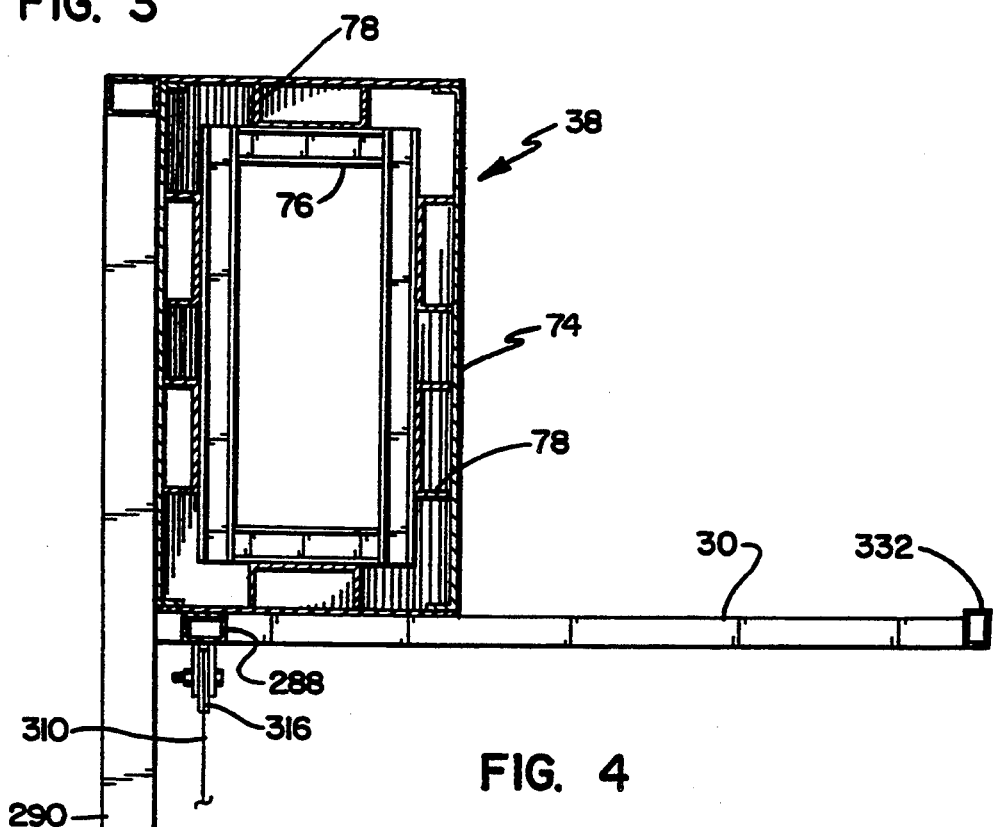
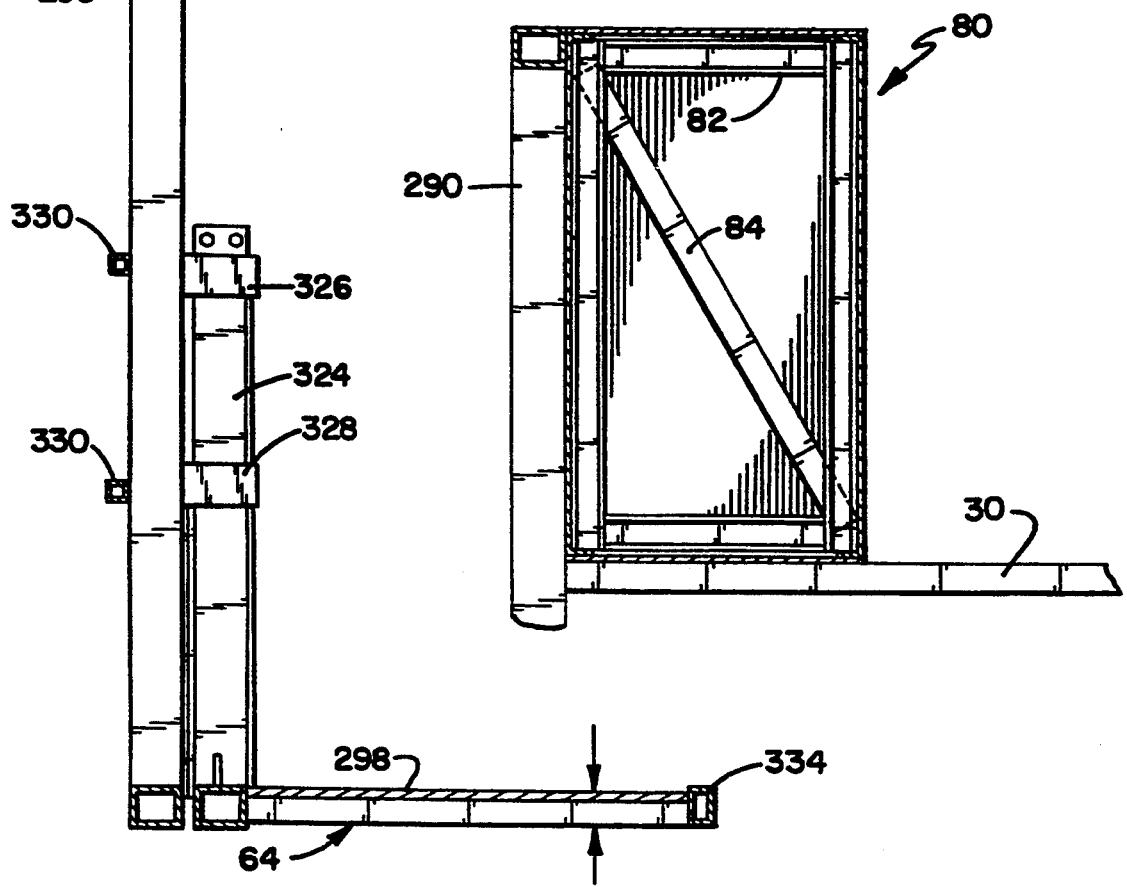

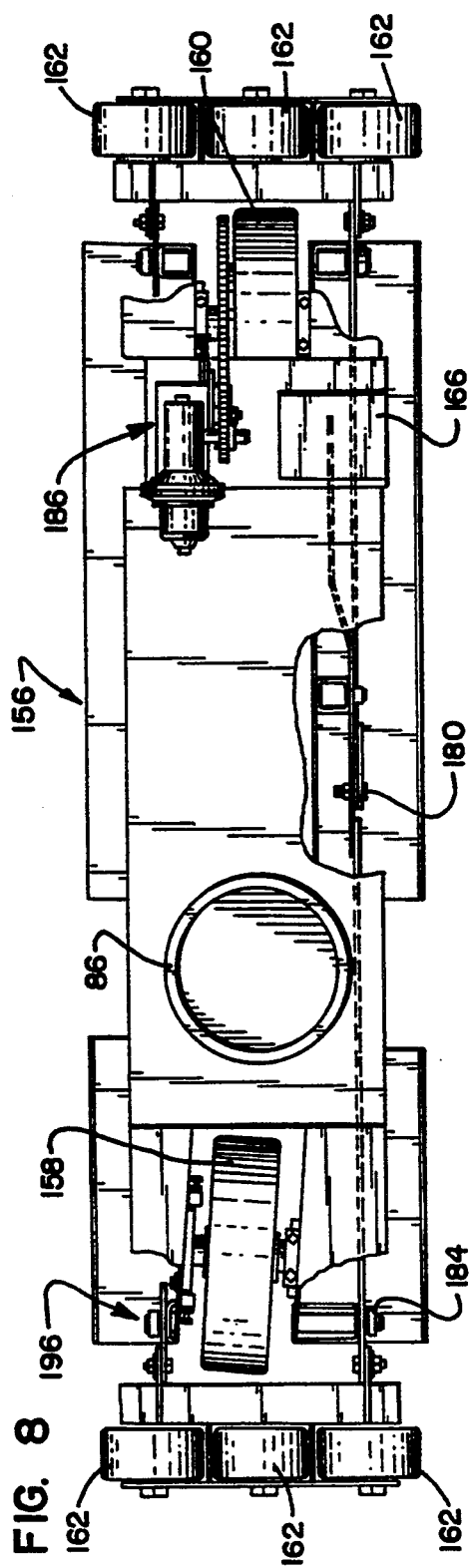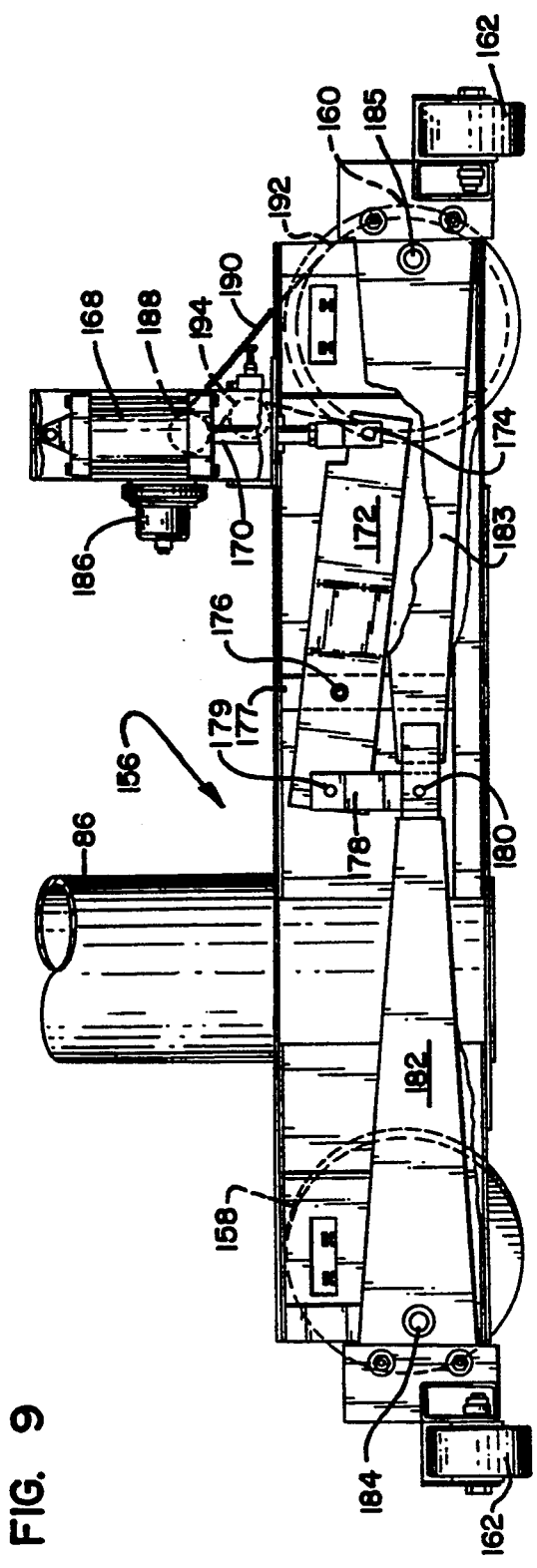

FIG. 26A
FIG. 26B
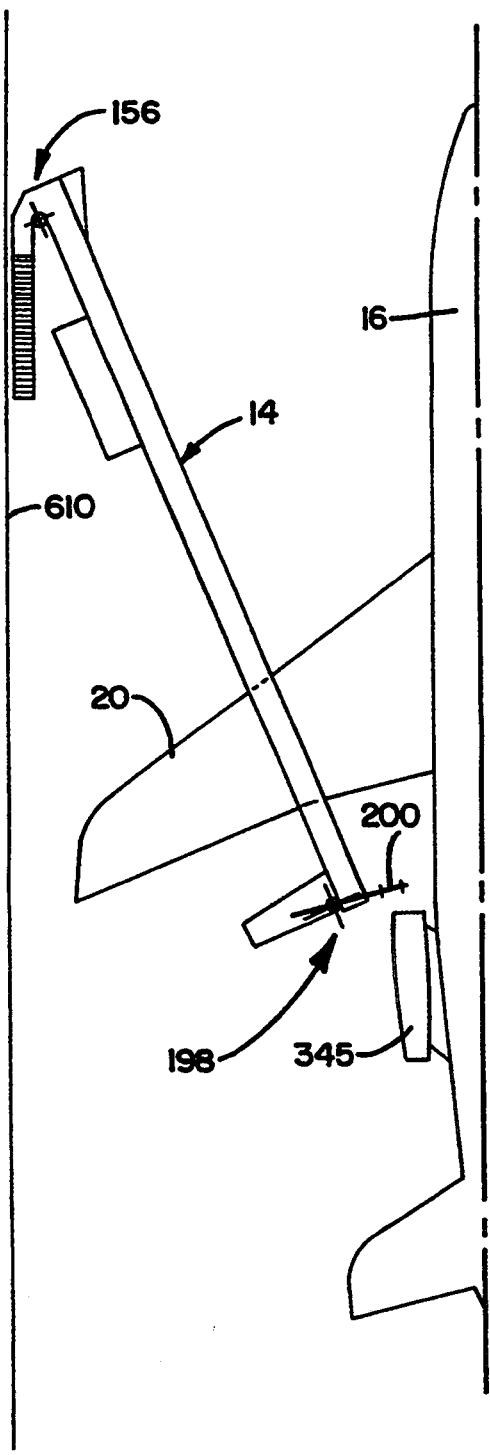
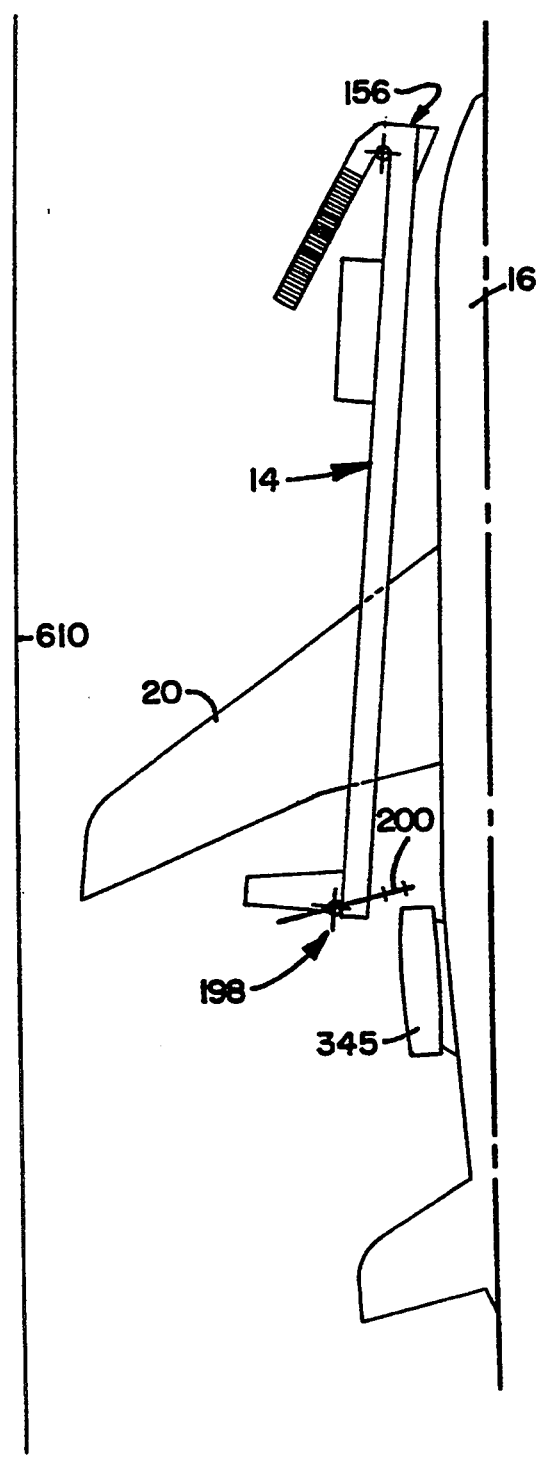

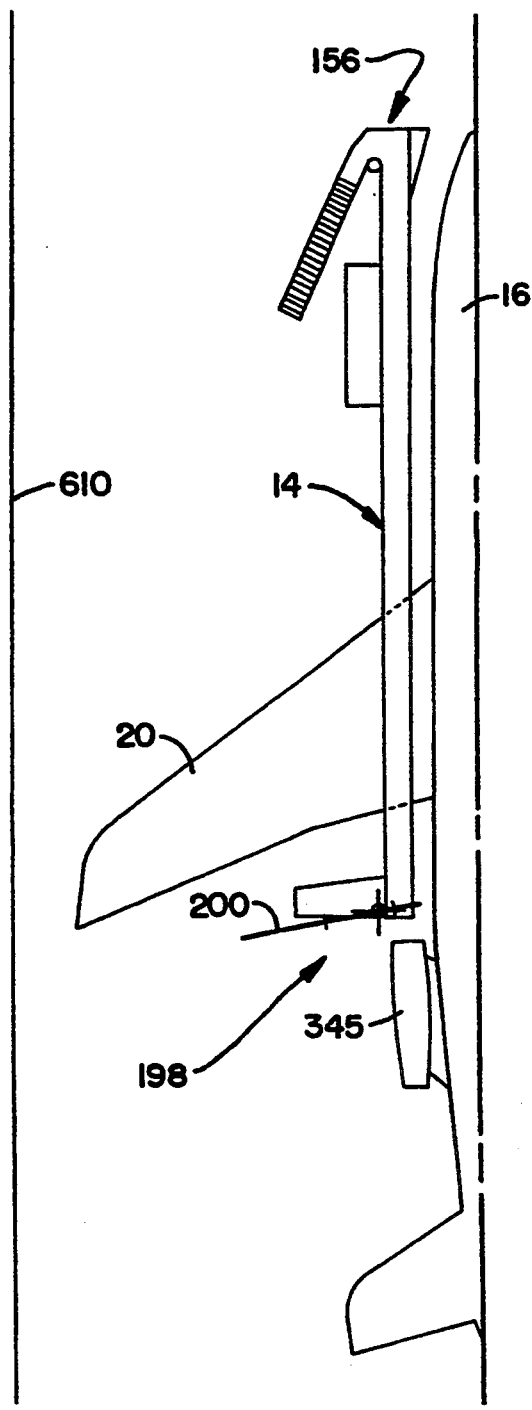
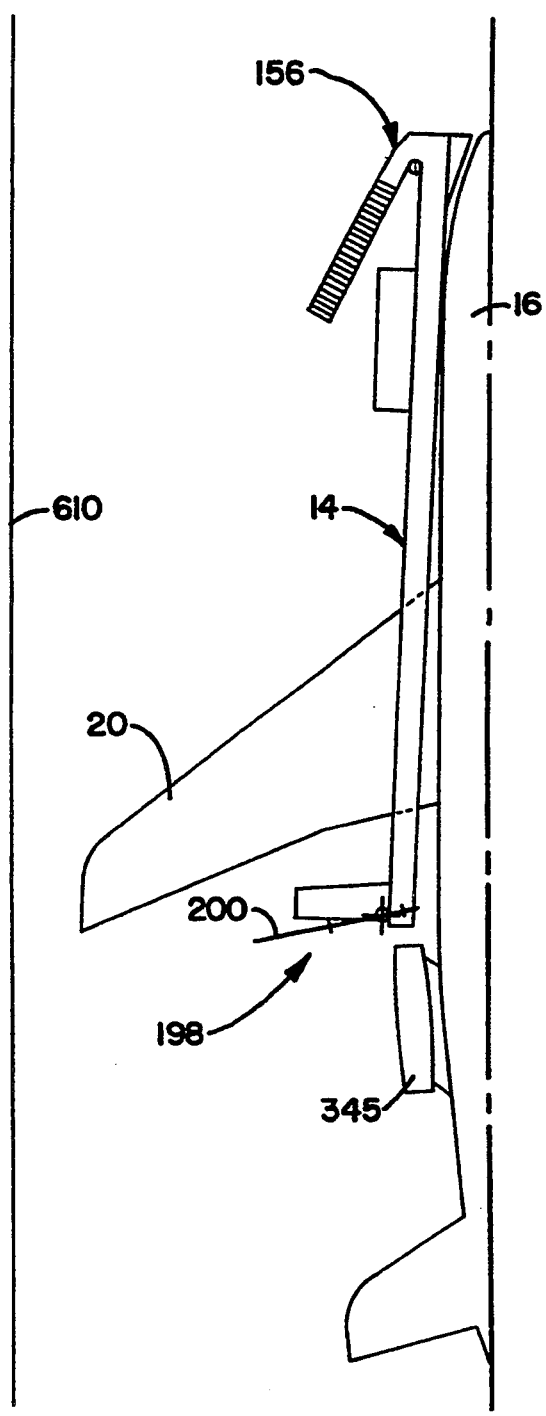

BRIDGE DOCKING STRUCTURE FOR AIRCRAFT

This is a continuation-in-part of Ser. No. 640,982, filed on Jan. 14, 1991, the disclosure of which is hereby incorporated herein.

BACKGROUND OF THE INVENTION

1. Field of the Invention

This invention relates to systems which are used to provide access to commercial jet aircraft during maintenance. More specifically, the invention relates to an aircraft maintenance system that is simple to deploy and is more effective at providing access to different types of aircraft than systems which have previously been used.

2. Description of the Prior Art

Regular and thorough maintenance is necessary to ensure that the large fleets of modern airliners used in commercial aviation are as safe and reliable as possible. For economic reasons, it is important that such maintenance be carried out as quickly and efficiently as possible.

In practice, it is sometimes difficult for individual maintenance personnel to gain access to desired areas on an aircraft. To address this problem, certain roof-suspended scaffolding systems have been devised. Such a system is disclosed in U.S. Pat. No. 3,602,335 to Gustetic. Among other disadvantages, such systems often require reinforcement of the roof of a maintenance hangar before they can be deployed. Other, prior art systems include those disclosed in U.S. Pat. Nos. 3,256,955 to Izmirian et al., and 3,831,709 to Stanford et al.

One problem that is common to all three of the above-disclosed systems is that, generally, they are readily adjustable to receive different types of aircraft. For example, most aircraft have a characteristic downward inclination from the nose of the fuselage toward the tail section while they are resting on the ground. Typically, prior art maintenance systems are not readily adjustable at both ends to accommodate themselves to such differences between aircraft. Furthermore, prior art systems are not length-adjustable to permit servicing of different sizes of aircraft. These are all significant disadvantages to the prior art, since most commercial airlines have several different types of aircraft in their fleets.

Another problem not addressed by existing systems is that exit and entry ports along the fuselage of the aircraft are typically not arranged in a linear path. In systems that use strictly horizontal access walkways along the length of the fuselage, maintenance personnel are forced to traverse significant vertical upward or downward steps to gain entry to the fuselage at certain points. This, of course, presents danger, particularly when tools or aircraft components are carried into or out of the fuselage.

Yet another problem that exists in such systems is the difficulty of gaining access to the various engines of the aircraft. For example, a Boeing 727 airliner has three engines, all in the tail section of the aircraft. To date, no system has been devised which provides adequate access to all three engines, particularly when removal of one or more of the engines is required.

Other specific aircraft models present access problems as well. For example, the size of Boeing 747 aircraft require special arrangements to gain access to such portions as the horizontal and vertical stabilizers of the aircraft.

It is clear that there has existed a long and unfilled need in the prior art for an aircraft maintenance facility that can be deployed without reinforcement of a maintenance hangar, which is adjustable to the inclination of different types of aircraft, which is vertically adjustable to provide access to different ports along an aircraft fuselage, and which is readily adaptable to provide access to engines on an aircraft.

SUMMARY OF THE INVENTION

Accordingly, it is an object of this invention to provide an aircraft maintenance facility that does not necessitate reinforcement of an aircraft maintenance hangar.

It is further an object of the invention to provide an aircraft maintenance facility that is adjustable to the characteristic inclination of different types of aircraft.

It is further an object of this invention to provide an aircraft maintenance facility which provides vertically-adjustable access along different points of an aircraft fuselage.

It is also an object of the invention to provide ready access to each of the different engines of an aircraft.

It is yet further an object of the invention to provide an aircraft maintenance facility that is quickly deployable in operative position adjacent an aircraft.

To achieve these and other objects of the invention, a fuselage dock assembly for aircraft maintenance and repair according to a first aspect of the invention includes a first ground-supported column; a second ground-supported column; and a walkway system supported at a first location by the first column and at a second location by the second column, the walkway system including a structural space frame extending longitudinally therealong for torsionally reinforcing the walkway section against stress created by components of the walkway section, workers and equipment which are proximate an aircraft.

According to a second aspect of the invention, a fuselage dock assembly for aircraft maintenance and repair includes a walkway system; ground-supported structure for moving the walkway system into a working position adjacent to a fuselage section of an aircraft; and a platform for gaining access to a horizonal stabilizer fin of the aircraft, the platform being mounted to the walkway system so as to moveable into working position along with the walkway system.

According to a third aspect of the invention, a fuselage dock assembly for aircraft maintenance and repair includes a first ground-supported column; a second ground-supported column; and a walkway system supported in a first location by the first column and at a second location by the second column; the walkway system including a plurality of vertically spaced walkways which are positionable adjacent to a vertical stabilizer of an aircraft, whereby access can conveniently be gained to the vertical stabilizer during maintenance of the aircraft.

According to a fourth aspect of the invention, an assembly for supporting maintenance personnel and equipment during maintenance or repair of an aircraft includes a platform; at lest one slide board mounted to the platform so as to be slidably extendable from the platform, whereby the assembly can be arranged to conform to the shape of an aircraft; and structure for releasably locking the slide board in position with respect to the platform, whereby the slide board will not move during use of the assembly to maintain an aircraft.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 2A and 2B are a side elevational view of the aircraft maintenance and repair system illustrated in FIG. 1;

FIG. 3 is a cross-sectional view taken along one point of a walkway section in the system illustrated in FIGS. 1 and 2;

FIG. 4 is a fragmentary cross-sectional view taken along a second portion of the walkway section;

FIG. 8 is a cutaway top plan view of a forward trolley in the system which is illustrated in FIGS. 1-7;

FIG. 9 is a fragmentary cutaway view of the forward trolley illustrated in FIG. 8;

FIGS. 26(a)-26(e) are diagrammatical views of a facility according to FIGS. 1-25 being deployed in operative position adjacent an aircraft;

DETAILED DESCRIPTION OF THE PREFERRED EMBODIMENT(S)

Figure 1A:
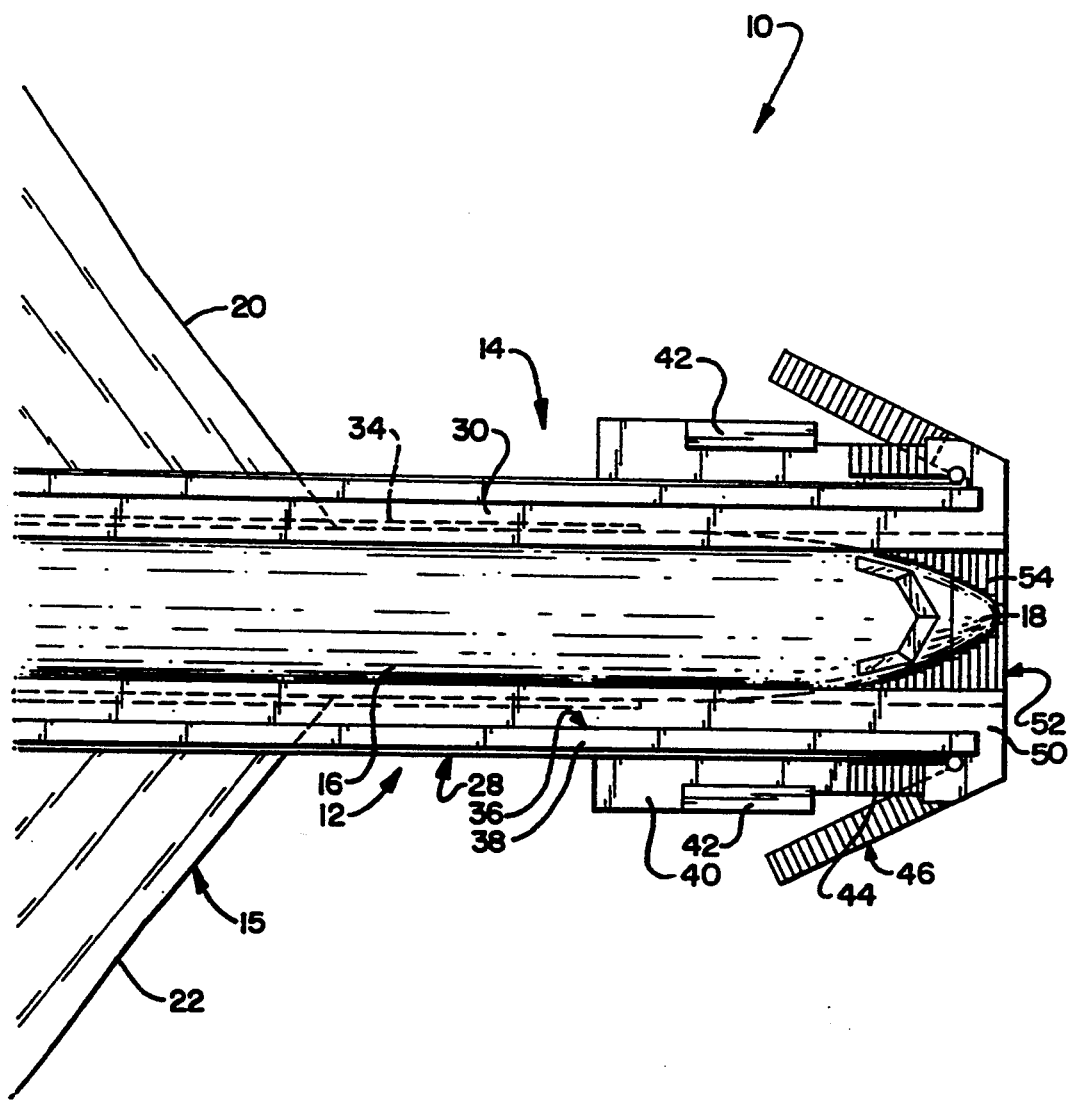
FIGS. 1A and 1B are a top plan view of an aircraft maintenance and repair system constructed according to a preferred embodiment of the invention.

Referring now to the drawings, wherein like reference numerals designate corresponding structure throughout the views, and referring in particular to FIGS. 1A and 2A, an aircraft maintenance and repair system 10 constructed according to a preferred embodiment of the invention includes a first fuselage docking assembly 12 and a second fuselage docking assembly 14. Docking assemblies 12, 14 are positioned on opposite lateral sides of a fuselage 16 of an aircraft 15, as may be seen in FIGS. 1A and 2. Aircraft 15 further has a nose section 18, a left wing 20 and a right wing 22. It should be understood that docking assemblies 12, 14 are substantially identical except that they are constructed so as to be symmetrically opposite to each other, although other minor variations can be made to ensure compatibility with asymmetrical features on different types of aircraft.

Referring primarily to FIG. 2A, each dock assembly 12, 14 includes a first ground-supported column 24, a second ground-supported column 26 and a walkway section 28 which is supported at a first location by column 24 and at a second location by column 26. Both column 24 and column 26 are height adjustable, which allows the height and inclination of walkway 28 to be adjusted relative to a horizontal plane. In this way, the walkway section can be adjusted to conform to the natural inclination of several different types of aircraft. The walkway section could also be vertically lowered to gain access to the landing gear on an aircraft. The specific structure which permits the columns 24, 26 to be so adjusted is discussed in greater detail below.

Referring again to FIG. 2A, it will be seen that walkway section 28 includes an upper level walkway 30 and a lower level walkway 32, for accessing different vertical portions of the fuselage 16. An inside edge 34 of lower level walkway 32 is depicted in FIG. 1A. As can be seen in FIG. 3, the inside surface of upper level walkway 30 extends further inwardly than inside surface 34, so as to conform to the outer curvature of the fuselage 15.

One particularly important feature of the invention is the provision of a stress reinforcing member 36 which extends along the length of walkway section 28. As may be seen in FIGS. 3 and 4, stress reinforcing member 36 is embodied as a box-like beam 38, which is constructed to stiffen walkway section 28 against torsional deformation in response to torsional moments which would be created by weight on upper level walkway 30. The specific construction of box-like beam 38 will be discussed in greater detail below in reference to FIGS. 3 and 4.

Looking again to FIGS. 1A and 2A, walkway section 28 includes a forward work platform 40 which is designed to be positioned proximate a forward entry port of aircraft 15. Shelving 42 is provided integrally on walkway section 28 immediately proximate work platform 40, for ready storage of tools or aircraft components. An inter-level stairway 44 is provided at a forward end of work platform 40 for access between walkways 32, 30. As can best be seen in FIGS. 2 and 15, a lower stairway section 46 is pivotally mounted at an upper end to walkway section 28, and is supported by the underlying ground surface on a second, lower end by casters 62. As a result, lower stairway section 46 will continuously adjust relative to the ground as walkway section 28 is raised or lowered. Casters 62 permit lower stairway section 46 to move with dock assembly 12, 14 during deployment of the dock assembly 12, 14 in position adjacent to an aircraft 15.

Figure 12:
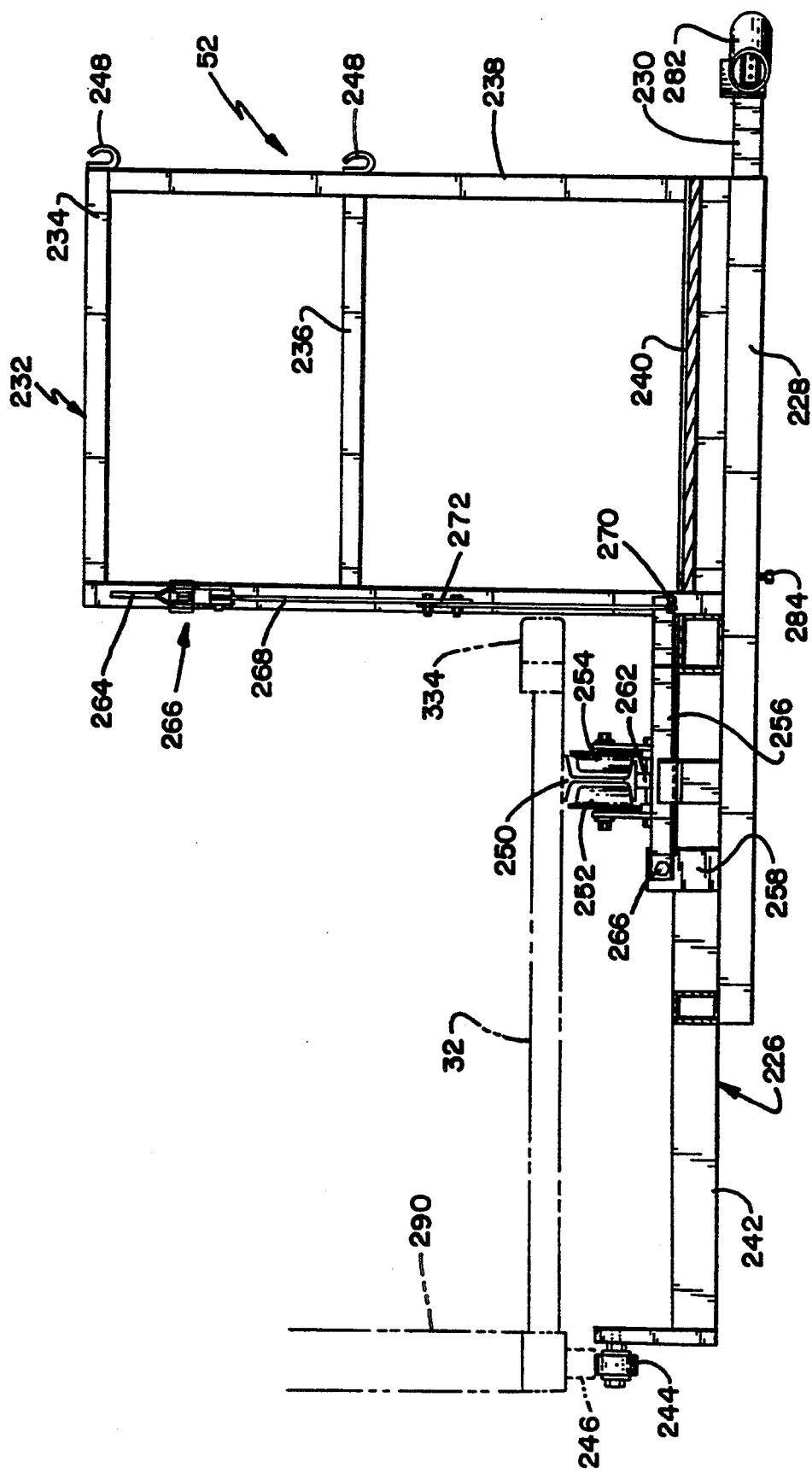
FIG. 12 is a fragmentary cross-sectional view of an extendable nose-engaging section in the system illustrated in FIGS. 1-11.
Figure 15:
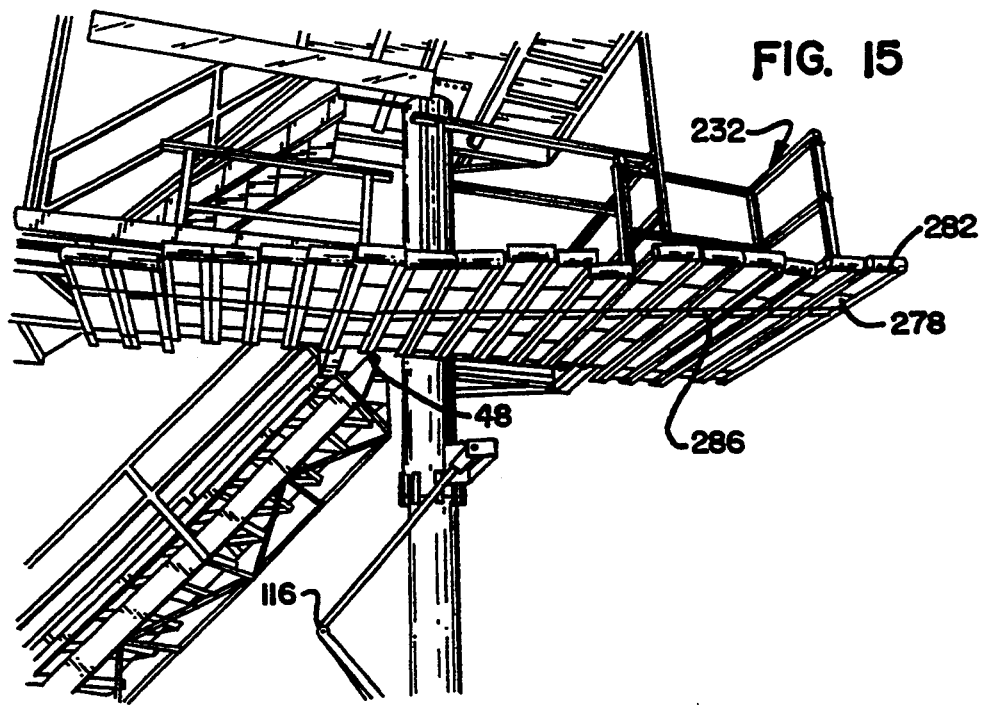
FIG. 15 is a lower perspective view of a forward portion of the system illustrated in FIGS. 1-14.

Each dock assembly 12, 14 further includes an extendable nose-engaging portion 52, as can best be seen in FIGS. 1A, 12 and 15. Each extendable nose-engaging portion 52 includes a plurality of slide board members 54 which are individually extendable to conform to the outer dimensions of nose section 18 of aircraft 15. The various features of nose engaging portion 52 will be discussed in greater detail below.

As may be seen in FIG. 2A, first ground-supported column 24 is mounted on a forward trolley unit 56, which will be described in greater detail with reference to FIGS. 5, 8 and 9. An electric motor 58 is mounted on a top end of column 24, for controlling the height adjustment thereof. An alignment mechanism 60 is further provided to ensure that the components of columns 24 remain aligned during extension and retraction.

According to one important feature of the invention, a plurality of adjustable work platforms 64 are provided within the main truss system 70 of walkway section 28. By individually adjusting the level of the various work platforms 64, walkway section 28 can be made to conform to the various ports and entry ways on different types of aircraft. This is an important advantage, since the various ports and entry ways on aircraft are frequently not in linear alignment.

Other features of walkway section 28 include a plurality of fluorescent lights 66, most of which are mounted on the lower surface of upper level walkway 30 to illuminate the area beneath. An electrical distribution panel 68 is part of an overall electrical distribution system which provides power to the fluorescent lamps 66, as well as to numerous electrical outlets throughout the walkway section 28. Dock assemblies 12, 14 further include a system for distributing compressed air, and may also be adapted to distribute heat or air conditioning into the fuselage by using box-like beam 38 as a distribution manifold.

Referring now to FIGS. 3 and 4, each box-like beam 38 includes an outer skin 74 which is metallic and rectangular in cross-section, as may be seen in FIG. 3. Periodically along the length of beam 38 are positioned interior framing members 76, which are also rectangular in cross-section and are fabricated by four heavy duty steel structural elements welded together in rectangular fashion. A plurality of stiffener elements 78 each having a U-shaped cross-section extend longitudinally within box-like beam 38 between outer skin 74 and the outer edges of interior framing member 76. Upper level walkway 30 is welded to a lower surface of outer skin 74, as may be seen in FIG. 3. When weight is placed upon upper level walkway 30, a torsional force will be transmitted in a clockwise direction to box-like beam 38. This force is transmitted through stiffeners 78 to the interior framing member 76 which provide additional resistance against deformation. As a result, upper level walkway 30 may be made as long as necessary to service a fuselage 16, without fear of torsional deformation.

FIG. 4 illustrates box-like beam 38 at a joint portion 80 which joins various sections of outer skin 74. At joint portions 80, a joint framing member 82 formed from heavy steel structural elements into a rectangular shape is provided for coupling the outer skin portion 74 and the stiffeners 78. For further reinforcement against torsional deformation at this point, a diagonal brace 84 is further provided within the joint framing member 82.

Figure 5:
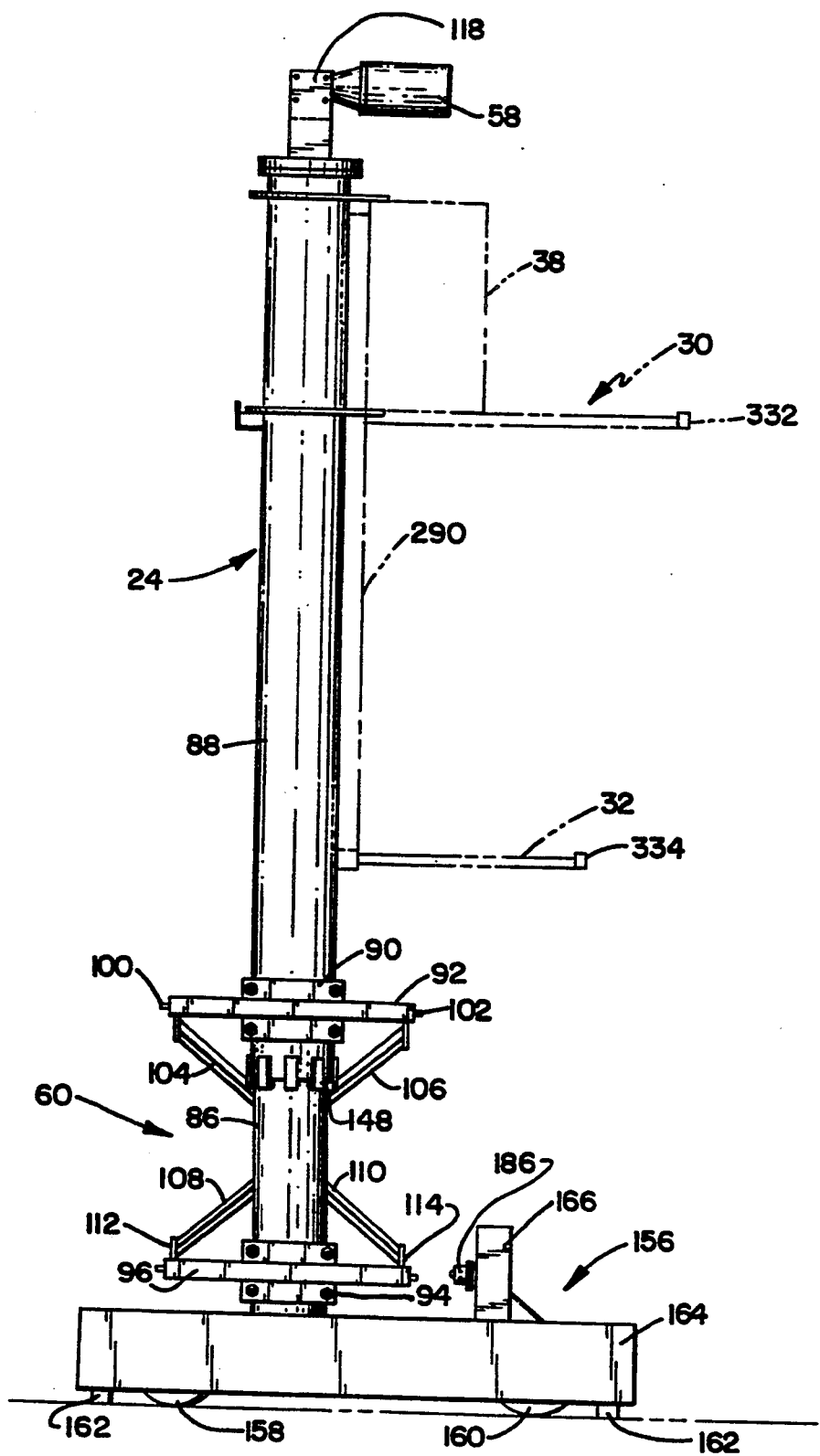
FIG. 5 is a fragmentary isolational view of a first ground-supported column in the system which is illustrated in FIGS. 1-4.
Figure 7:
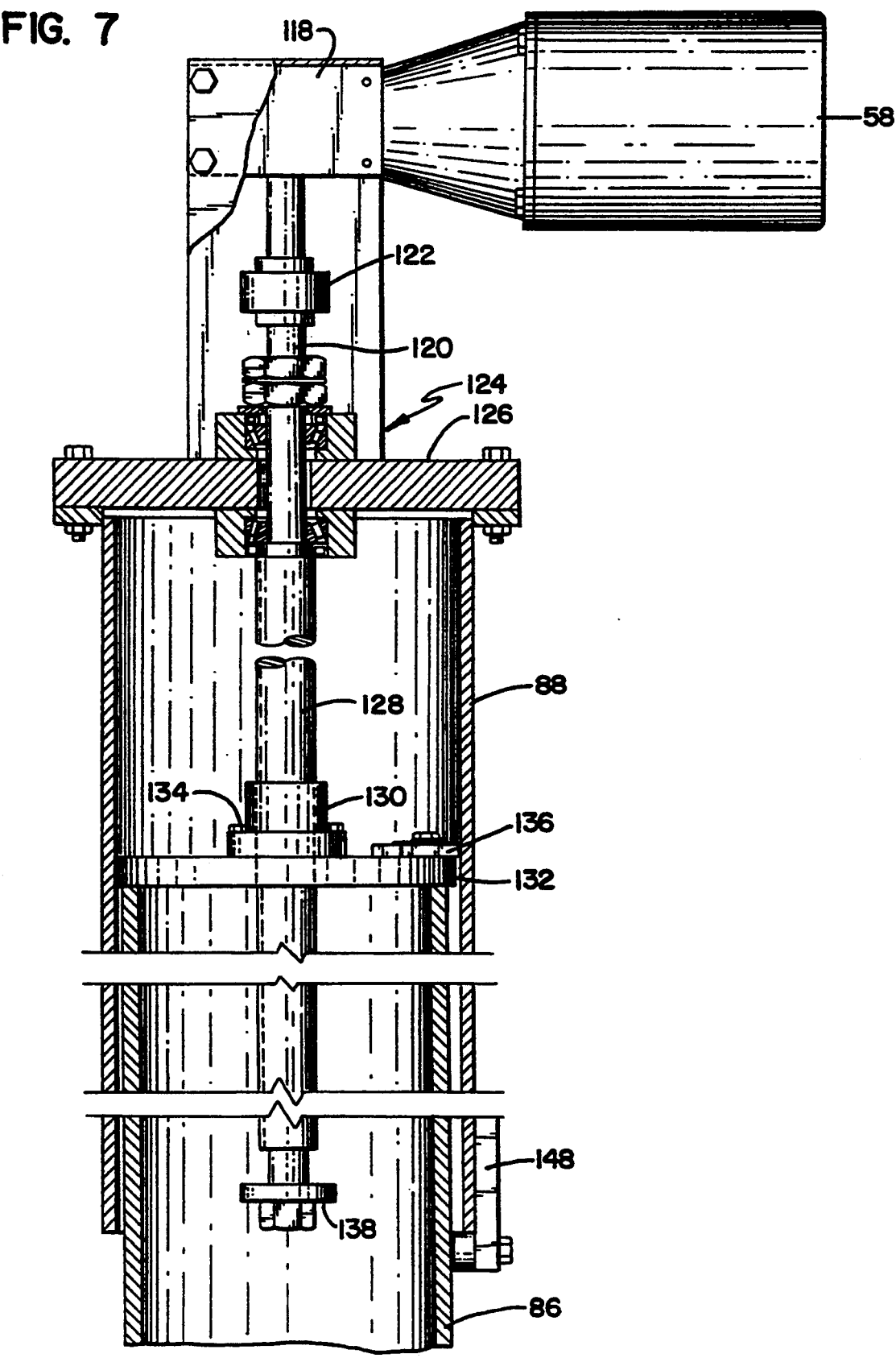
FIG. 7 is a fragmentary cross-sectional view through a section of a column which is illustrated in FIG. 5.

Referring now to FIGS. 5 and 7, the construction of first ground-supported column 24 and accessories thereto will now be described in detail. As may be seen in FIG. 5, first ground-supported column 24 includes a first tubular member 86 which is telescopingly received within a second, upper tubular member 88. Alignment mechanism 60 maintains first tubular member 86 in rotational alignment with respect to second tubular member 88 as the members 86, 88 are moved relative to each other. As may be seen in FIG. 5, alignment mechanism 60 includes an upper collar 90 which is mounted to second tubular member 88, and a lower collar 94 which is mounted to first tubular member 86. An upper cross bar 92 and a lower cross bar 96 are mounted to the upper and lower collars 90, 94, respectively. A first arm 104 and a second arm 106 are hingedly mounted to opposite ends of upper cross bar 92 by first and second hinges 100, 102, respectively. Similarly, a third arm 108 and a fourth arm 110 are hingedly mounted to opposite ends of lower cross bar 96 by a third hinge 112 and a fourth hinge 114, respectively. First, second, third and fourth arms 104, 106, 108 and 110 are connected together at second, opposite ends thereof by a common hinge mechanism 116 as may be best seen in FIG. 15.

Referring again to FIGS. 5 and 7, the jack screw mechanism for raising and lowering first ground-supported column 24 will now be described in detail. As may be seen in FIG. 7, a gear reduction unit 118 is provided for transmitting power from an electric brake-motor assembly 58 to a shaft 120 via a coupling 122. Brake-motor assembly 58 is a commercially available unit that applies a braking action to its output shaft at all times other than when power is being supplied to turn a motor therein. Shaft 120 is mounted for rotation relative to a cover plate 126 on top of second tubular member 88 by a thrust roller bearing 124. As may further be seen in FIG. 7, shaft 120 includes a lower threaded shaft portion 128 on an end thereof which is positioned thrust roller bearing 124. Threaded shaft portion 128 is threadedly engaged with a threaded follower member 130, which is mounted to a cover plate 132 via bolts 134. Cover plate 132 is secured to a top end of first tubular member 86. It will be appreciated that rotation of shaft 120 by motor 58 will cause second tubular member 88 to either extend or retract from first tubular member 86, depending upon the direction of rotation. In this way, the extension of first ground-supported column is controlled, and the height and inclination of walkway 28 may be adjusted relative to a horizontal plane. Limit switches (not shown) are also provided to limit relative extension and contraction of the members 86, 88 beyond predetermined upward and downward limits by cutting off power to the motor 58.

As may further be seen in FIG. 7, a plurality of composite slide bearings 136 are mounted to the cover plate 132 on top of first tubular member 86. In the preferred embodiment, at least three slide bearings 136 are provided between the tubular members 86, 88 and are spaced at even intervals along the upper circumference of first tubular member 86. Slide bearings 136 ensure smooth, slop-free movement between the members 86, 88. As may be seen in FIG. 5, a plurality of retention bearings 148 are mounted to a lower end portions of second tubular member 88 to further stabilize movement between the elements 86, 88 and to prevent the elements 86, 88 from slipping apart. A stop plate 138 is further provided at a lowermost end of shaft 120 for limiting upward movement of second tubular member 88 with respect to cover plate 132.

Figure 6:
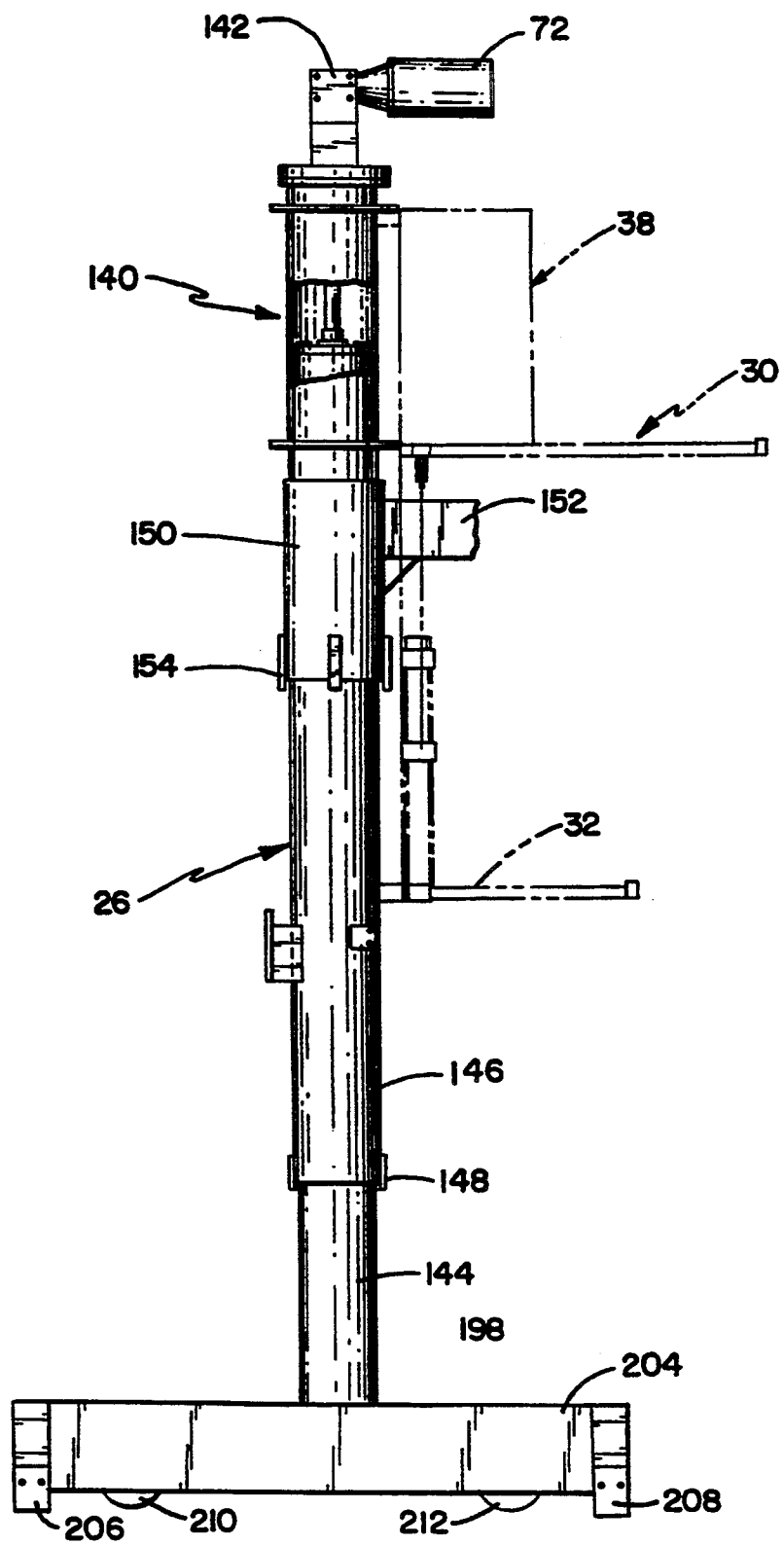
FIG. 6 is a fragmentary isolational view of a second ground-supported column which is illustrated in FIGS. 1-5.

FIG. 6 depicts the specific construction of second ground-supported column 26. Second ground-supported column 26 includes a jack screw arrangement 140 which is substantially the same as that which is provided for first ground-supported column 24. A gear reduction unit 142 is provided for transmitting power from electric motor 72 to the jack screw arrangement 140. Jack screw arrangement 140 telescopingly adjusts the position between a first tubular member 144 and a second tubular member 146.

A rotatable pivot sleeve 150 is mounted for rotation about second tubular member 146. Retention bearings 154 are provided to maintain pivot sleeve 150 in alignment with second tubular member 146. A support arm 152 extends from rotatable pivot sleeve 150 for supporting an engine inlet access plank 360, as may be seen in FIG. 17. A rotary mechanical transmission which is powered by a crank 362 is also mounted to an outer surface of pivot sleeve 150 for rotating sleeve 150 relative to second tubular member 46. The purpose of plank 360 will be discussed in greater detail below.

Referring now to FIGS. 5, 8 and 9, the specific construction of forward trolley assembly 156 will now be described in detail. Forward trolley 156 includes a first large wheel 158 and a second large wheel 160. First large wheel 158 is mounted to rotate in a plane which is slightly angled with respect to the plane in which second large wheel 160 is mounted to rotate. As a result, each forward trolley assembly 156 will move in a radiused path, the significance of which will be discussed below with reference to FIGS. 26(a)–26(e). Trolley assembly 156 further includes a plurality of smaller wheels 162 which are mounted laterally on the outer ends of trolley assembly 156. The smaller wheels 162 are mounted to rotate in planes which are substantially perpendicular to the paths in which large wheels 158, 160 are mounted to rotate in. Specifically, the path in which large wheels 158, 160 are mounted to rotate in is substantially perpendicular to the longitudinal axis of fuselage 15, while the planes in which wheels 162 rotate in are parallel to the axis.

As may be seen in FIG. 5, forward trolley assembly 156 includes an outer housing 164 which is secured to a lower end of first tubular member 86. A pneumatic actuator housing 166 is mounted to an upper portion of outer housing 164. A pneumatic cylinder 168 is mounted within housing 166. A piston having a shaft 170 is sealingly provided within cylinder 168 for extension and retraction according to pneumatic pressure within cylinder 168. As is best shown in FIG. 9, piston shaft 170 is connected at a lower end to a lever arm 172 via a pivot connection 174. Lever arm 172 is itself pivotally mounted about a pivot point 176 with respect to a vertical support member 177 that is fixed relative to outer housing 164. Lever arm 172 is mounted to a linkage 178 at a second opposite end from its connection to piston arm 170 by a pivot connection 179. A second, opposite end of linkage 178 is connected to first ends of a first wheel support arm 182 and a second wheel support arm 183 via a pivot connection 180.

As is further shown in FIG. 9, first wheel support arm 182 is pivotally mounted with respect to housing 164 by a pivot connection 184. A plurality of the small wheels 162 are fixedly mounted to first wheel support arm 182 on an opposite side of pivot connection 184 from linkage 178. Similarly, the second set of small wheels 162 are connected to second wheel support arm 183 on an opposite side of pivot connection 185 from the pivot connection 180 which connects linkage 178 and second wheel support arm 183. From the above it will become apparent that extension of piston shaft 170 will cause linkage 178 to be pulled upwardly, thereby causing both sets of small wheels 162 to move downwardly beneath the lowermost points on the first and second large wheels 158, 160. As a result, forward trolley assembly 156 will rest entirely upon the small wheels 162. When piston shaft 170 is retracted, small wheels 162 will likewise retract, thereby leaving the entire weight of forward trolley assembly 156 on the first and second large wheels 158, 160.

Forward trolley assembly 156 further includes a pneumatic motor 186 which includes an output sprocket 188 that is connected to a drive chain 190. Drive chain 190 is engaged with a wheel sprocket 192 on second large wheel 160. An adjustable guide sprocket 194 is also engaged with drive chain 190 for adjusting the tension on drive chain 190. When motor 186 drives output sprocket 188, power is transmitted to second large wheel 160 via drive chain 190 to move the trolley assembly 156 in an arcuate motion which is dictated by the differing inclinations of first large wheel 158 and second large wheel 160. The movement of trolley assemblies 156 in relation to the overall system will be discussed in greater detail below.

Figure 1B:
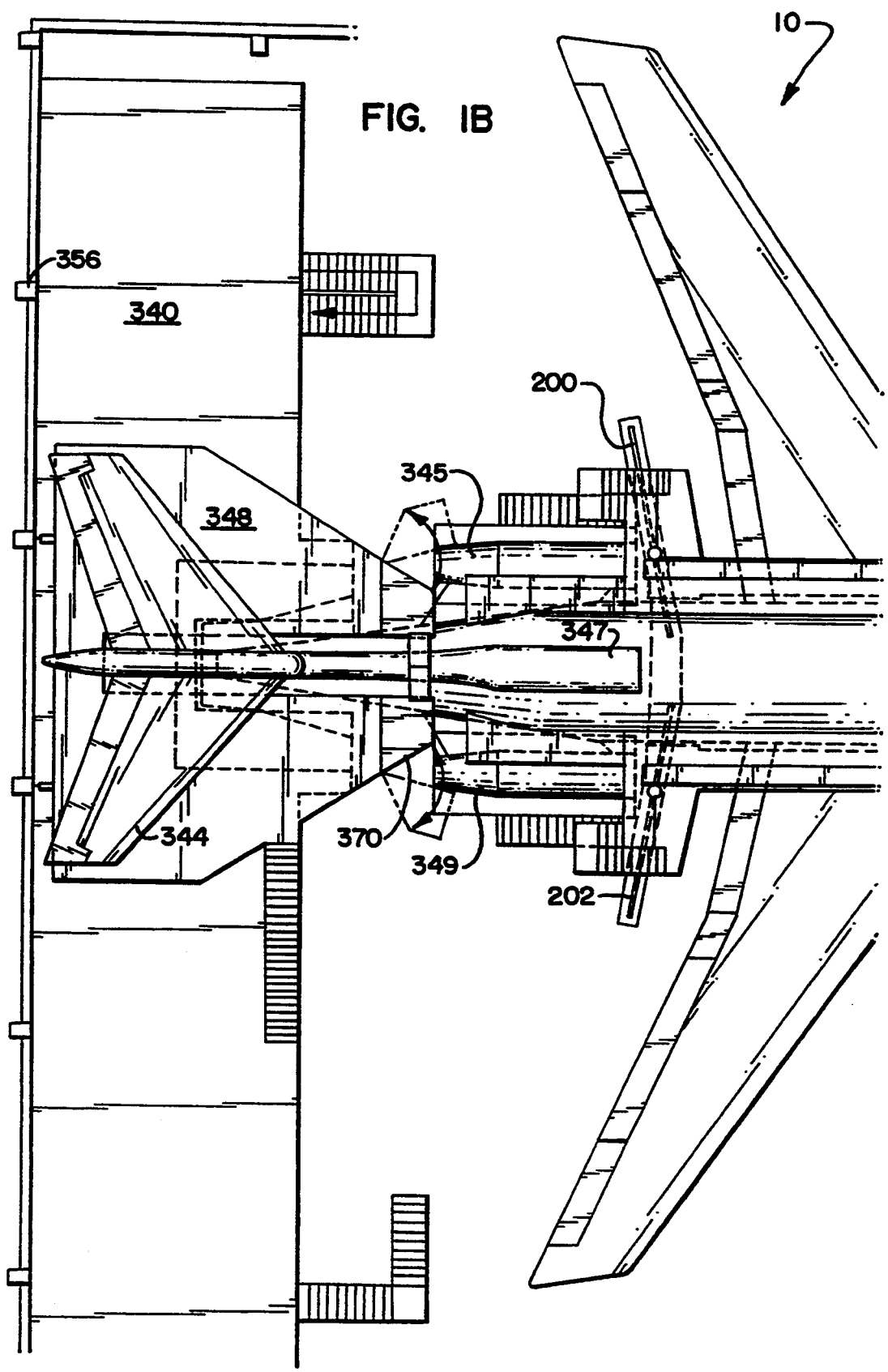
Figure 10:
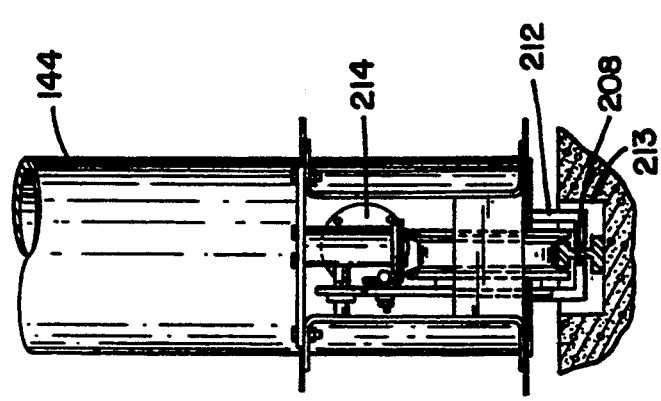
FIG. 10 is a fragmentary cutaway side elevational view of a second, rear trolley assembly in the system illustrated in FIGS. 1-9.
Figure 11:
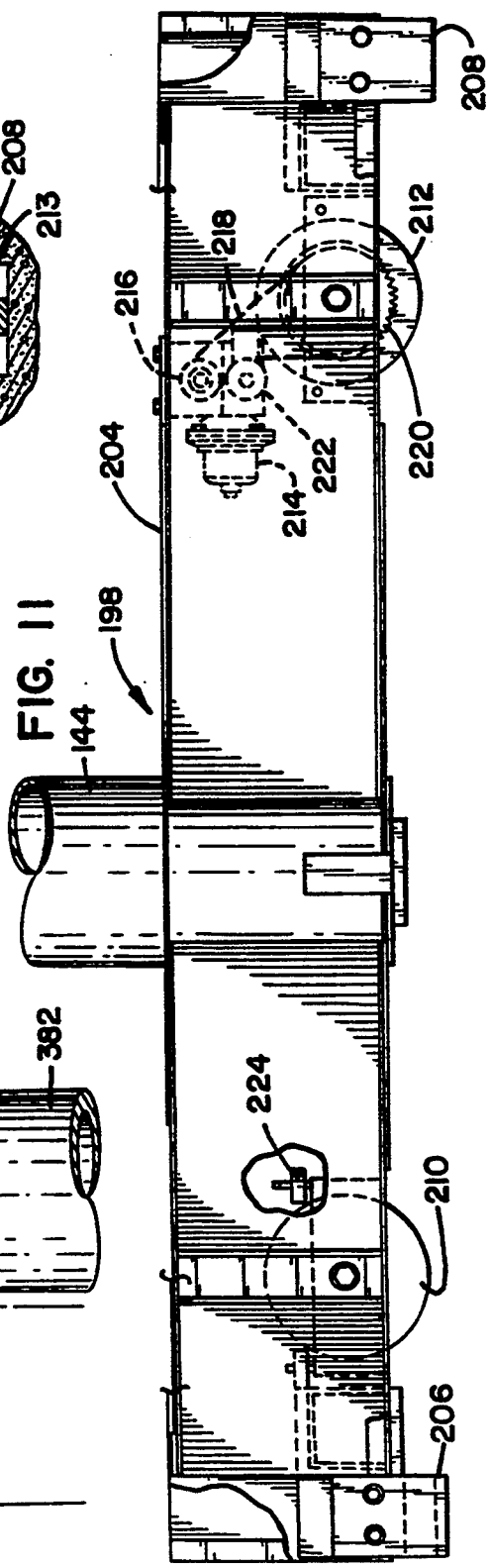
FIG. 11 is a fragmentary cutaway front elevational view of the rear trolley assembly illustrated in FIG. 10.

Referring now to FIGS. 10 and 11, the specific instruction of the rear trolley assembly 198 will be described in detail. As may be seen in FIG. 11, rear trolley assembly 198 includes an outer housing 204 which is secured to a lower end of first tubular member 144. Referring briefly back to FIG. 1B, the rear trolley assemblies 198 of the different fuselage dock assemblies 12, 14 are mounted on second and first guide rails 202, 200, respectively. Guide rails 202, 200 are preferably mounted in an underlying concrete surface within an aircraft maintenance and repair hangar. As may be seen in FIG. 1, each rail 200, 202 is angled outwardly and rearwardly with respect to a line that is perpendicular to a longitudinal axis of fuselage 16.

Referring back to FIG. 11, a first rail clamp 206 and a second rail clamp 208 are connected to opposite ends of outer housing 204 for engaging the rail 200, 202 upon which trolley assembly 198 is mounted for guidance. Rail clamps 206, 208 effectively engage the contour of rails 200, 202 to stabilize the fuselage assembly 12, 14 when external forces begin to tip the assembly. A first track wheel 210 and a second track wheel 212 are further provided and are engaged with the respective rail as well. A pneumatic motor 214 is mounted within outer housing 204 and includes a drive sprocket 216 which is engaged with a drive chain 218. Drive chain 218 is also engaged with a wheel sprocket 220 on second track wheel 212. A guide sprocket 222 is also engaged with drive chain 218 for adjusting the tension thereof. In this way, pneumatic motor 214 can rotate second track wheel 212, and thus move rear trolley assembly 198 on the respective rail 200, 202.

Turning now to FIG. 12, the specific construction of extendable nose engaging section 52 will now be described in detail. Nose engaging section 52 includes a frame 226 which is longitudinally slidable relative to the lower level walkway 32 of walkway section 28. Frame 226 includes a plurality of horizontally oriented housing members 228 for a corresponding number of slide boards 230. As can be seen in FIG. 15, slide boards 230 allow the inward most edge nose engaging section 52 to better conform to the external dimensions of the nose section 18 of the fuselage 16. A guard rail member 232 having an upper horizontal ramp 234, a lower horizontal rail 236 and a plurality of vertical rails 238 is provided on the edges of a horizontal work platform 240 that are not positionable adjacent to fuselage 16. As may be seen in FIG. 12, work platform 240 is also part of frame 226. Frame 226 further includes a stabilizer arm 242 which extends horizontally towards an outer edge of lower level walkway 32. As can be seen in FIG. 12, a raised track 246 is provided in alignment beneath the vertical frame reinforcing members 290 on lower level walkway 32. A wheel 244 is rotatably mounted to a vertical arm on a distal end of stabilizer arm 242. Wheel 244 is positioned to ride upon track 246. Also mounted to a lower surface of lower level walkway 32 is a longitudinal track 250 that is shaped in the form of an I-beam. I-beam track 250 is engaged on opposite sides thereof by a first wheel 252 and a second wheel 254, both of which are mounted for rotation by brackets which are mounted to a break arm 256. A break pad 262 is also mounted to a top surface of break arm 256, immediately beneath a bottom surface of I-beam track 250. Break arm 256 is itself pivotally connected to a bracket 258 at a pivot connection 266. Bracket 258 is integral with frame 226, as may be seen in FIG. 12.

As further shown in FIG. 12, a lever 264 is pivotally mounted to a vertical rail 238 of guard rail member 232. Lever 264 is connected to a brake linkage 268 via an over-center toggle linkage 266. A second, opposite end of brake linkage 268 terminates in a hook member 270, which is adapted to engage a notch on an end portion of brake arm 256 which is opposite from pivot point 266. As can be seen in FIG. 12, brake linkage 268 is formed in two separate lengths, which are connected together by one or more bolts through adjustment holes 272. In this way, the absolute length of brake linkage 268 can be adjusted.

When lever 264 is in its upward position, as shown in FIG. 12, brake linkage 268 urges break arm 256 to pivot about point 256 in a counterclockwise direction, thereby urging break pad 262 against the bottom surface of I-beam track 250. As a result, nose engaging section 52 is locked in a desired position with respect to walkway section 28. If an operator desires to extend or contact the overall length of a fuselage dock assembly 12, 14, he may pivot lever 264 downwardly, thereby disengaging break pad 262 from the bottom surface of I-beam track 250. The entire nose engaging section 52 will then be supported for rotation relative to walkway section 28 by rollers 244, 252 and 254. Nose engaging section 252 can be slid longitudinally to adjust to the length of fuselage 16 at this point, and then may be relocked relative to walkway section 28 by returning lever 264 to the locked position. Once locked in the desired position, one or more chains may be stretched across the nose section 18 of fuselage 16 from the hooks 248 which are provided on guard rail members 232 of the adjacent dock assemblies 12, 14.

Figure 14:
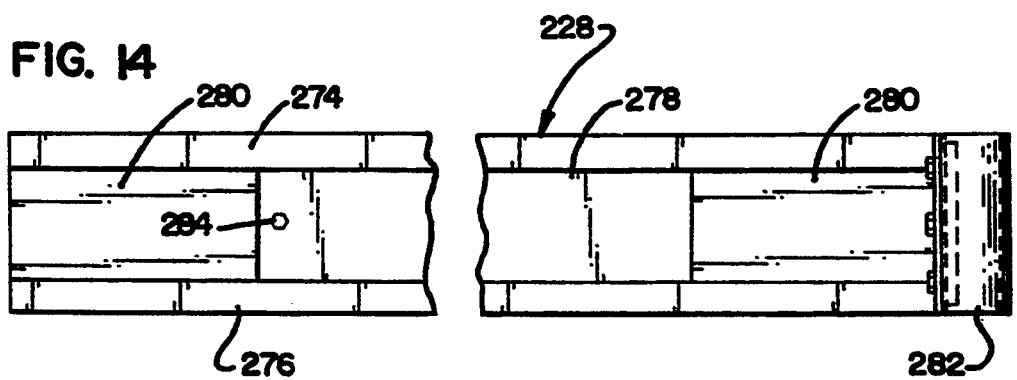
FIG. 14 is a bottom plan view of a second type of slide board assembly.
Figure 13:
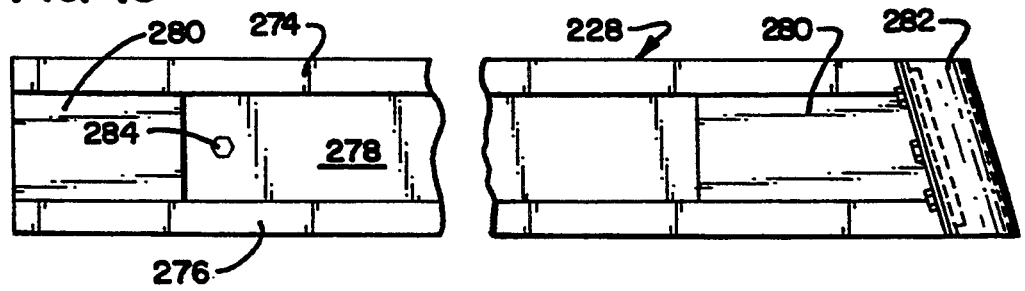
FIG. 13 is a bottom plan view of an extendable slide board assembly in the system illustrated in FIGS. 1-12.

Referring to FIGS. 12-15, the construction of the slide board assemblies will now be discussed. Each slide board 230 is formed from plate metal to have a top surface, a pair of side surfaces and a pair of oppositely facing bottom flanges, leaving an open space therebetween. At one point along the bottom of each slide board 230, a bottom plate 278 is welded to the bottom flanges, thereby giving slide board 230 a complete rectangular cross-section along the length of bottom plate 278. Each bottom plate 278 has a threaded hole defined therein for receiving a retention bolt 284, as can be seen in FIGS. 12-14. Each housing 228 likewise is formed of plate metal and includes a top surface, two side surfaces and flanges 274, 276 at the bottoms thereof. An open bottom portion 280 is defined between flanges 274, 276. As shown in FIG. 15, a reinforcement bar 286 extends transversely in a desired configuration across the different housing members 228. The innermost ends of slide boards 230 are provided with bumpers 282, which are preferably formed of short lengths of polymeric tubing. By extending each slide board 230 so that bumper 282 bears against the side of fuselage 216, those engaging section 52 will conform to the external curvature of nose section 18 of the aircraft 15. Bar reinforcement 286 acts in conjunction with the retention bolts 284 to prevent the slide boards 230 from being pulled too far out of the respective housings 228. The bumper elements 282 can be mounted transversely with respect to the axis of slide boards 230, as is shown in FIG. 14, or at an angle to better conform to the nose section 18, as is illustrated in FIG. 13.

Figure 16:
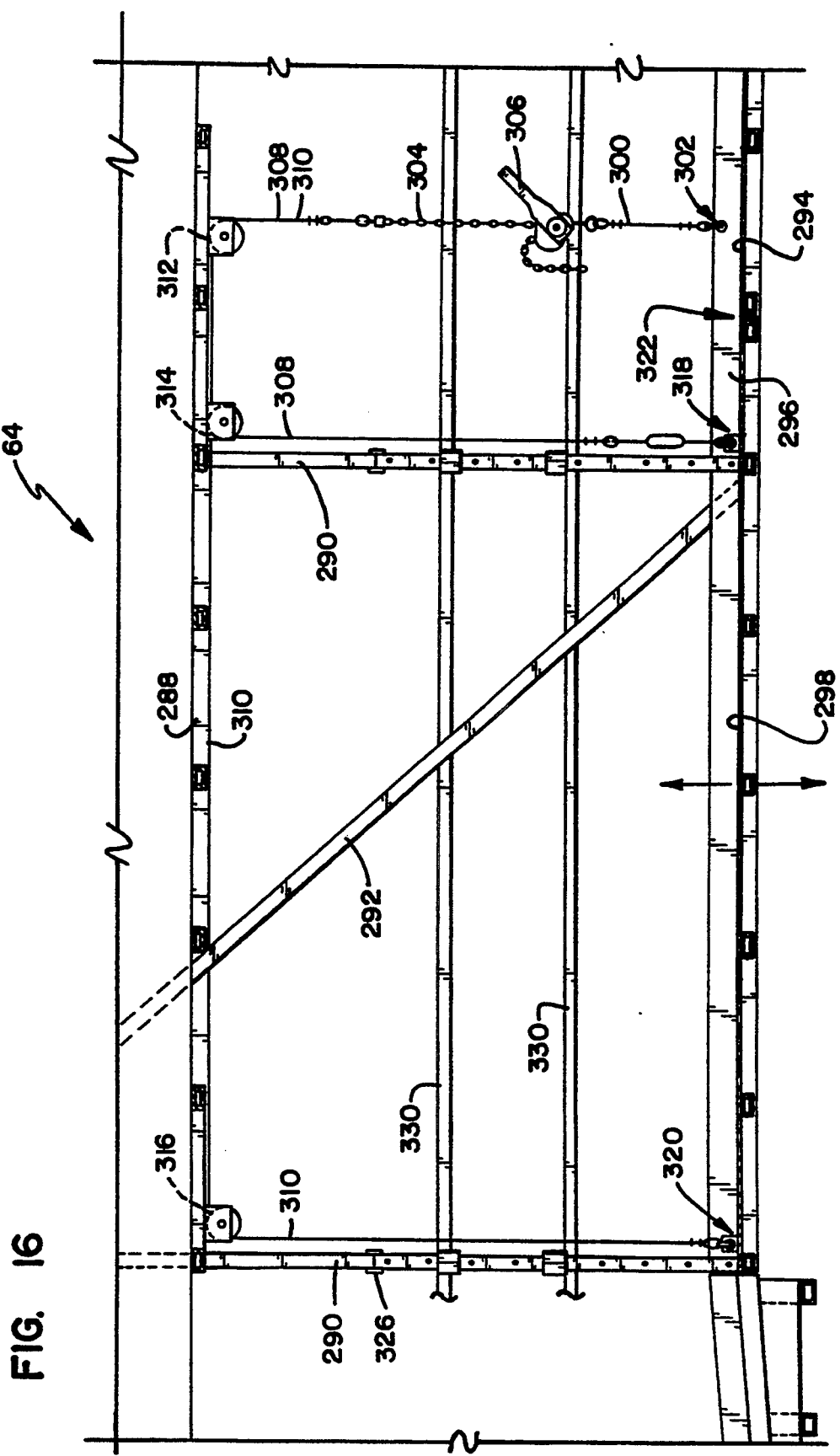
FIG. 16 is a fragmentary elevational view of an adjustable work platform in the system illustrated in FIGS. 1-15.

Referring now to FIGS. 2 and 16, the specific construction of adjustable work platform 64 will now be discussed in detail. As shown in FIG. 2, walkway section 28 includes a main truss system 70 which is formed by a plurality of upper longitudinal frame elements 288, lower longitudinal frame elements 296, vertical frame reinforcing members 290 and diagonal frame reinforcing members 292. The stationary lower walkway surface 294 is suspended from box-like beam 38 and upper longitudinal frame element 288 by diagonal frame reinforcing member 292 and vertical frame reinforcing member 290, as can be seen in FIG. 16. Lower longitudinal frame element 296 is integral with lower walkway surface 294, and provides additional rigidity thereto.

Adjustable work platform 64 includes an adjustable lower walkway surface 298 which is vertically adjustable with respect to stationary lower walkway surface 294. As shown in FIG. 16, adjustable lower walkway surface 298 is in one position abutted against stationary lower walkway surface 294 at a joint 322. A first cable 300 is secured to lower longitudinal frame element 296 by a connection 302. First cable 300 is connected at a second end to second and third cables 308, 310 via a chain 304 and a ratchet winch 306, which is constructed to selectively lengthen or shorten chain 304. As may be seen in FIG. 16, the second and third cables 308, 310 are supported for movement about a first guide pulley 312, which is mounted to upper longitudinal frame element 288. Second cable 308 is supported for movement about a second guide pulley 314, and is connected at a second end to the adjustable lower walkway surface 298 via a connection 318. Second guide pulley 314 is likewise mounted on upper longitudinal frame element 288. Third cable 310 is arranged to pass about a third guide pulley 316 which is also mounted to upper longitudinal frame element 288 above a second, opposite end of adjustable lower walkway surface 298. Third cable 310 has a second end which is connected to the second, opposite end of adjustable lower walkway surface 298 via a connection 320. It will be apparent that adjustable lower walkway surface 298 will be raised with respect to stationary lower walkway surface 294 when an operator uses ratchet winch 306 to effectively shorten chain 304. In this way, an operator can adjust the level of adjustable walkway surface 298 to correspond to the vertical position of a selected port, entryway, or aircraft service point in the fuselage 16 of aircraft 15. Adjustable lower walkway surface 298 may also be lowered beneath the level of walkway surface 294 by allowing chain 304 to ratchet out of winch 306.

Referring back to FIG. 3, it will be seen that a pair of horizontal guard rails 330 are mounted to outer edges of the vertical frame reinforcing members 290, in order to prevent maintenance personnel from falling off of the walkway surfaces 298, 294. A pair of vertical rails 324 are mounted to the adjustable lower walkway surface 298, as is also shown in FIG. 3. A first guide member 326 and a second guide member 328 are provided on each of the vertical frame reinforcing members 290 to constrain the adjustable work platform 64 into vertical movement only.

Figure 24:
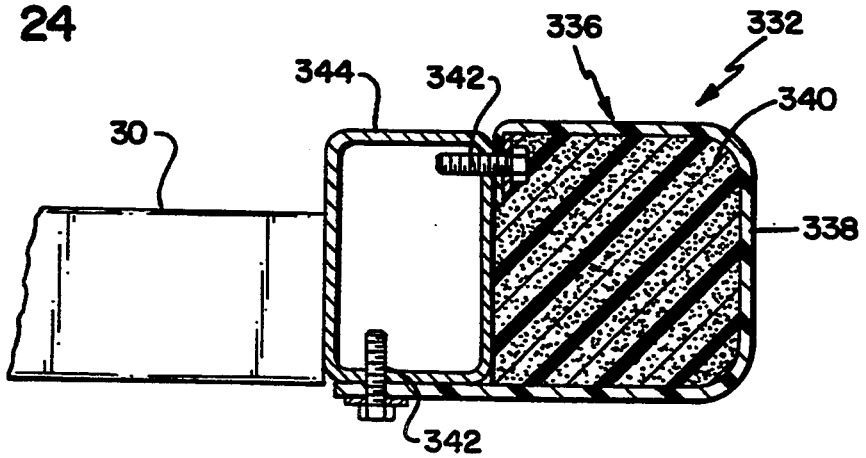
FIG. 24 is a cross-sectional view of a bumper member according to the system which is used to protect the fuselage of an aircraft during maintenance.

Referring briefly to FIGS. 3 and 24, it will be noted that the inside edges of both upper level walkway 30 and lower level walkway 32 are provided with resilient contact bumpers 332, 334, respectively. As shown in FIG. 24, contact bumper 332, which is substantially identical in construction to contact bumper 334, is mounted to upper level walkway 30 by a hollow mounting beam 334 via mounting bolts 342. The bumper 332 itself is formed as a resilient gasket member 336 having a tough resilient outer surface 338 and a foam rubber core 340. Preferably, raising an outer surface 338 is formed from a material such as reinforced neoprene.

Figure 17:
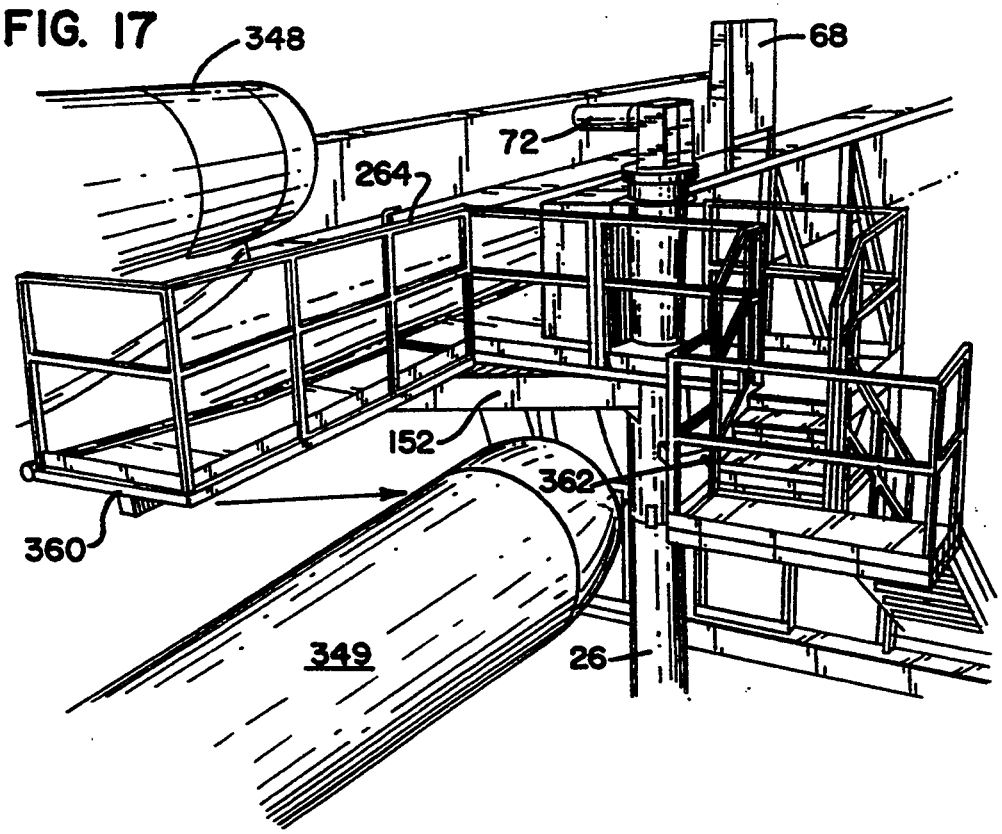
FIG. 17 is a rear perspective view of an aft portion of the system illustrated in FIGS. 1-16.

Referring briefly to FIG. 17, the rearward end of fuselage dock assembly 12, 14 include an engine inlet access plank 360, which is deployable to gain access to the inlet of the Number 2 engine 348 on a Boeing 727 or like aircraft. Access plank 360 is supported by a support arm 152, which is welded to rotatable pivot sleeve 150, as shown in FIG. 6. Rotatable pivot sleeve 150 is mounted for rotation about the second tubular member 146 on second ground-supported column 26, and includes a plurality of retention bearings 154 for supporting the weight of the sleeve 150 and engine access plank 360 relative to second tubular member 146. A manual crank 362 is provided on one side of pivot sleeve 150, as shown in FIG. 17. Crank 362 is connected to a transmission assembly (now shown) which is conventional in nature for rotating sleeve 150 and, hence, support arm 152 and plank 360 relative to second tubular member 146. By turning crank 362, an operator can rotate plank 360 toward or away from the fuselage 16 of aircraft 15 in order to gain access to the cowling of the Number 2 engine 348.

Referring now to FIGS. 1B, 2, 17–22 and 25, system 10 further includes a tail stand arrangement 344 for permitting access to a vertical tail section 343 and a number 2 engine 347 of aircraft 15, which in the illustrated embodiment is a Boeing 727 airliner. A pair of stands 346 are further provided within system 10 for gaining access to the number 1 and number 3 engines of aircraft 15.

Figure 2B:
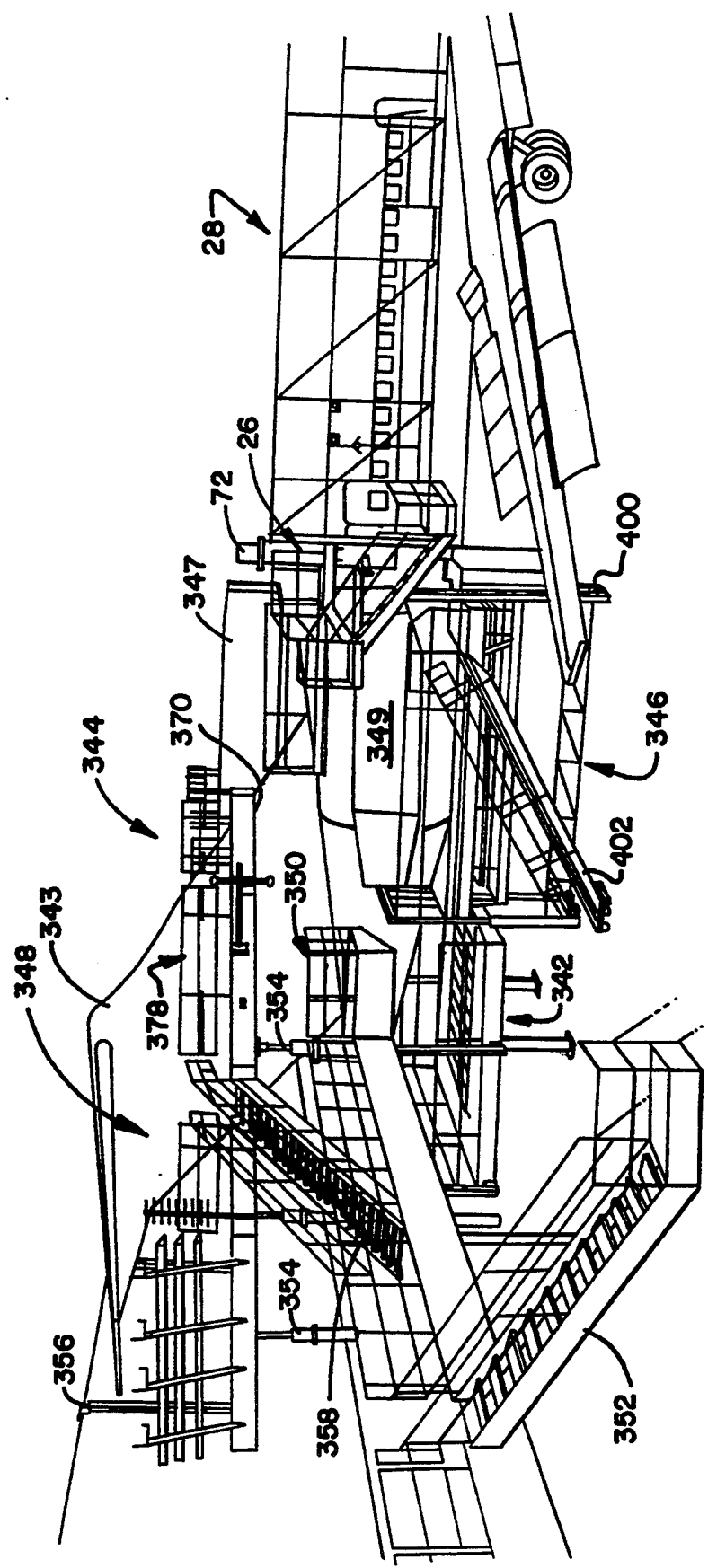

Referring to FIG. 2B, tail stand arrangement 344 includes a horizontal vertically movable upper platform 348 which is supported on a horizontal, fixed mid-level platform 350 by four evenly spaced jack screws 354. Mid-level platform 350 is fixed so as to be integral with the inside wall of a maintenance hangar facility. A stair 352 is provided for allowing aircraft maintenance personnel to walk from between mid-level platform 350 and a floor of the aircraft maintenance hangar.

Tail stand arrangement 344 further includes a number 2 engine stand 342, which is suspended from mid-level platform 350. Number 2 engine stand 342 is positioned for gaining access to the number 2 engine 347 of aircraft 15, which is a Boeing 727.

Figure 22:
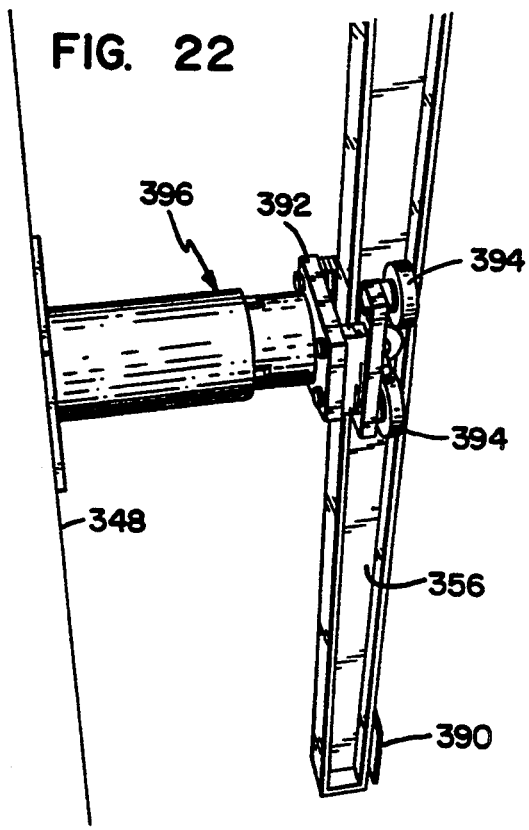
FIG. 22 is a perspective view of a third feature on the upper platform.
Figure 23:
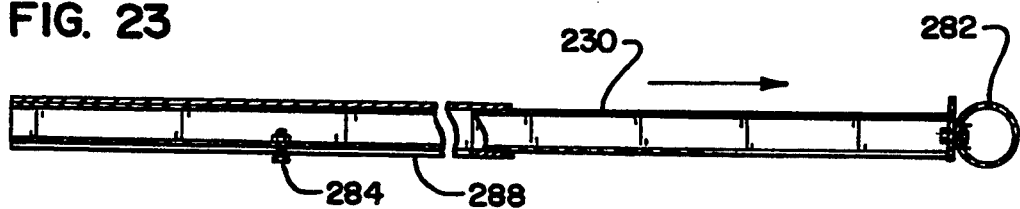
FIG. 23 is a cross-sectional view of one of the slide board assemblies according to the invention illustrated in FIGS. 1-22.

Referring to FIGS. 2B and 22, upper platform 348 is guided for linear movement with respect to the inner wall of an aircraft maintenance hangar or facility or a track member 356. Track member 356 is mounted so as to extend longitudinally vertically along an inner wall of the aircraft maintenance facility by a mounting plate 390. Upper platform 348 is mounted to a trolley bracket 392 via an axially adjustable connection 396, as is shown in FIG. 22. Trolley bracket 392 includes a plurality of trolley wheels 394 for engaging a track portion of track member 356. Through the stabilization provided by track member 356, upper platform 348 will remain horizontal and evenly spaced from the wall of the facility when raised or lowered by jack screws 354. As shown in FIG. 2B, a stairway 358 is pivotally mounted to upper platform 348 with a lower end thereof resting upon mid-level platform 350. As a result, stair 358 provides access between upper platform 348 and mid-level platform 350 regardless of the vertical adjustment therebetween.

Figure 21:
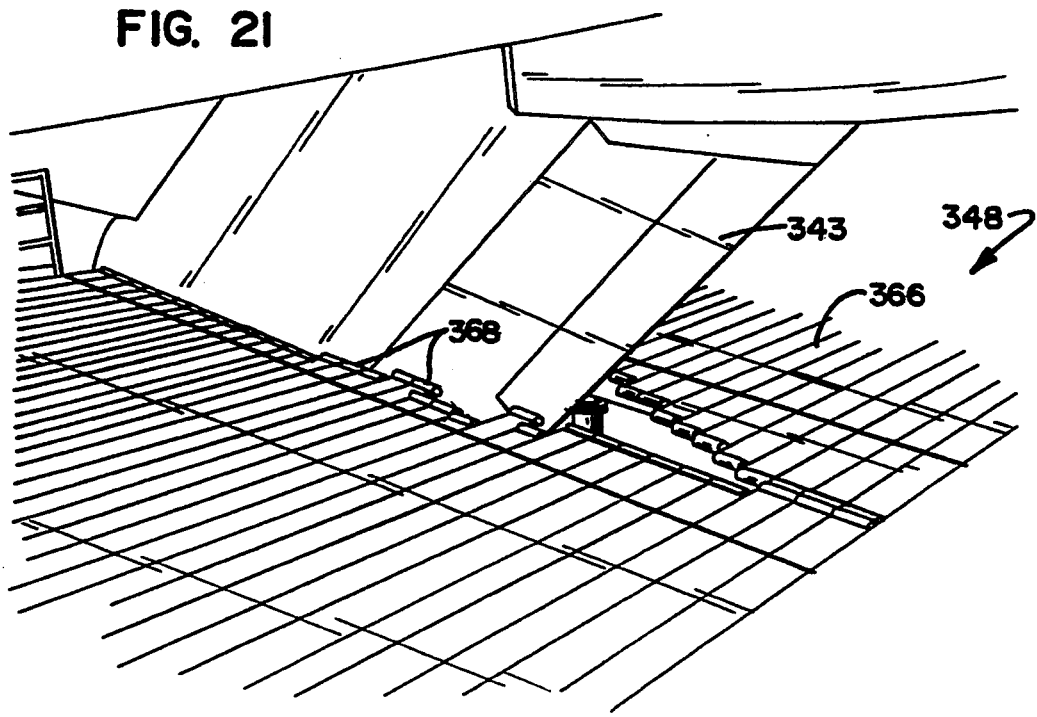
FIG. 21 is a perspective view of a second feature on the upper platform.

As shown in FIG. 21, upper platform 348 is provided with a plurality of slide boards 366 which are mounted within housings within upper platform 348 and are expandable to conform to the outer dimensions of tail section 343 during maintenance of aircraft 15. Each slide board 366 is provided with a bumper 368 on a distal end thereof. The construction of slide boards 366, bumpers 368 and the housings therefor are identical to those described above in reference to the slide boards on extendable nose engaging section 52.

Figure 20:
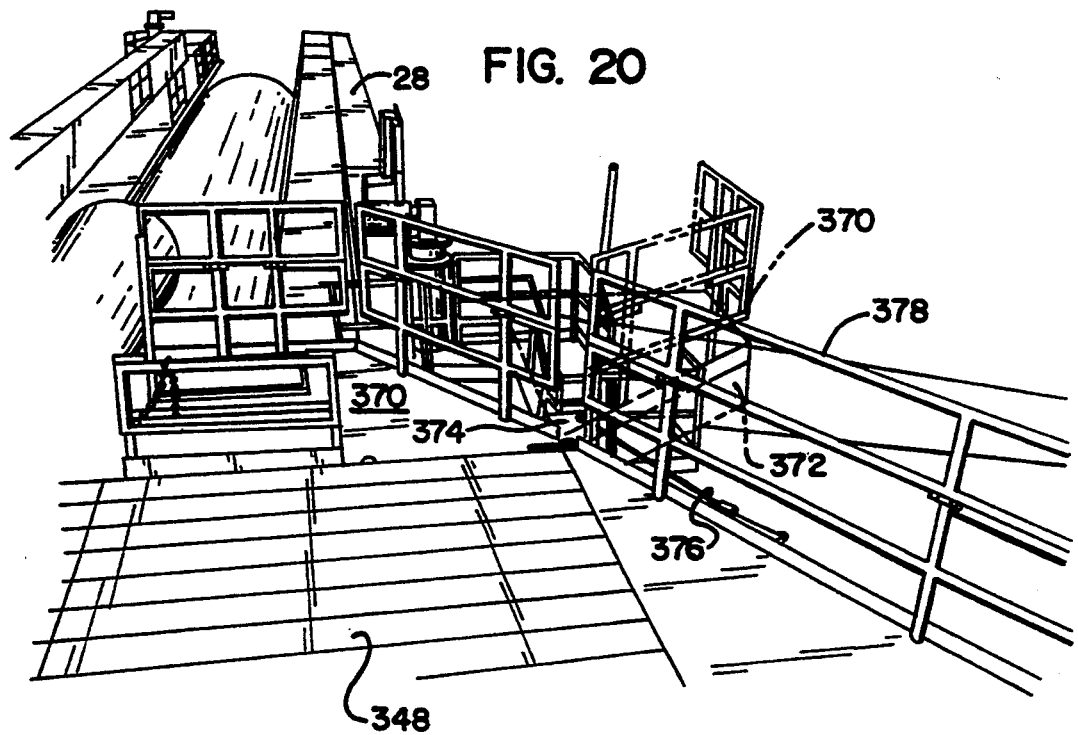
FIG. 20 is a perspective view of one portion of an upper tail access platform according to the system illustrated in FIGS. 1-19.

As shown in FIG. 20, upper level 348 is further provided with a deck section 370 which is pivotable away from the main portion of upper platform 348 to permit engines 345, 347, 349 to be accessed by a traversable overhead crane. In the preferred embodiment, swingable deck section 370 is pivotable through a bell crank arrangement 374 which is actuatable by a manual linkage 376, as is shown in FIG. 20. A support arm 372 is pivotally mounted to the remainder of upper platform 348 and supports deck section 370.

Figure 25:
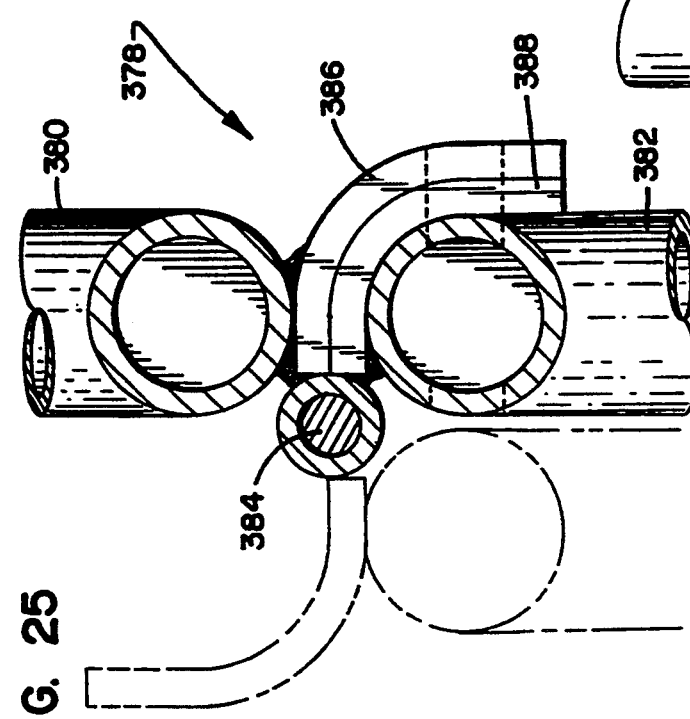
FIG. 25 is a fragmentary diagrammatic cross-sectional view of a guard rail fold-over hinge according to one aspect of the invention.

Another feature of upper platform 348 is the provision of the number of the height adjustable guard rails 378, which have a lower rail section 382 and an upper rail section 380. Upper rail section 380 is arranged to pivot downwardly about a hinge 384, as is shown in FIG. 25. A first arcuate stop member 386 on upper rail section 380 and a second arcuate stop member 388 on lower rail section 382 are provided to stabilize upper rail section 380 when it is locked in the upward position, as is shown in FIG. 20. Fold-over guard rails 370 increase the flexibility of system 10 for use when maintaining different types of aircraft.

Figure 18:
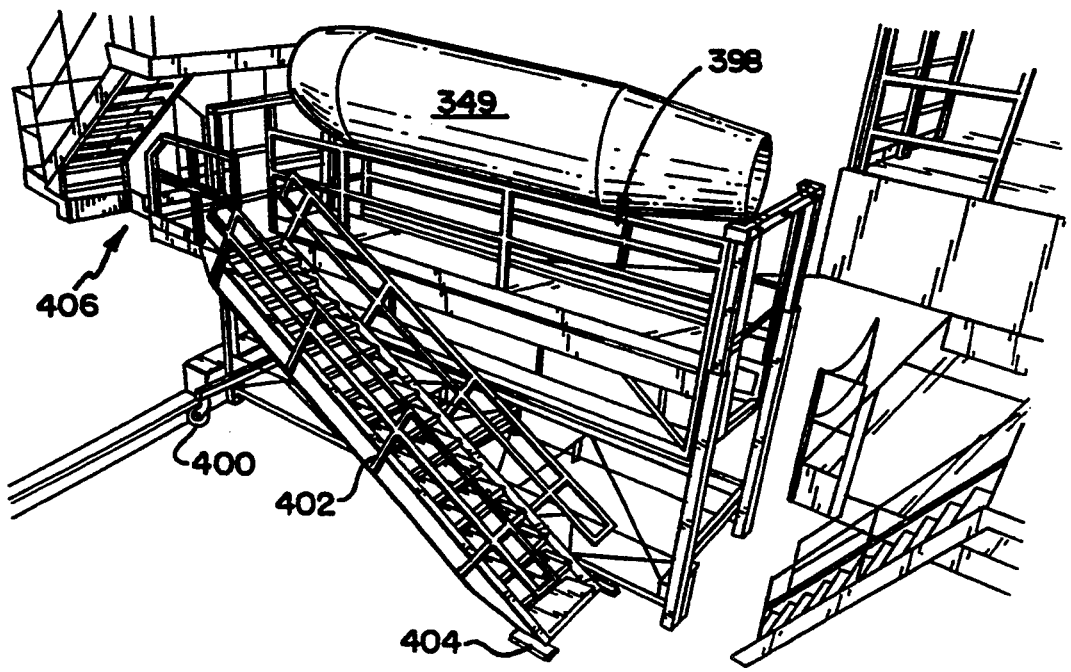
FIG. 18 is a top front perspective view of an engine access stand within the system illustrated in FIGS. 1-17.
Figure 19:
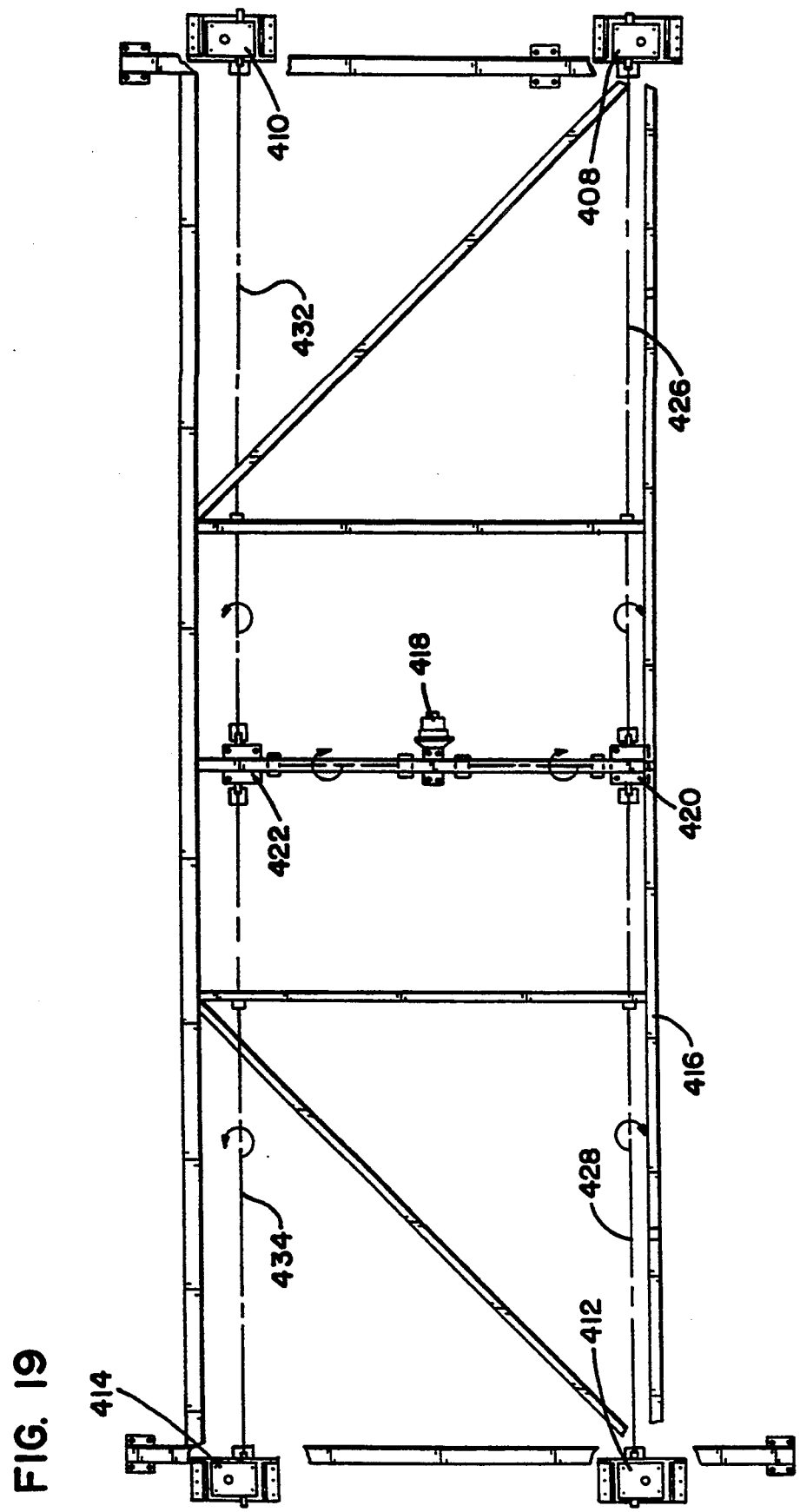
FIG. 19 is a schematic view of an H-drive assembly in the engine stand illustrated in FIG. 18.

A stand 346 for gaining access to the number 1 and number 3 engines of an aircraft is illustrated in FIGS. 2, 18 and 19 of the drawings. As may be seen in FIG. 18, engine stand 346 includes a work platform 398 which is vertically adjustable with respect to an engine 349 of aircraft 15. A stairway 402 is pivoted at its upper end to adjustable work platform 398, and is supported on the floor of the facility on a second, lower end by casters 404. Casters 400 are provided to support a frame 416 of the engine stand 346. To vertically adjust platform 398 relative to the frame 416 of engine stand 346, as well as with respect to engine 349, an electric motor 418 is connected to a first shaft 424, as is shown in FIG. 19. First shaft 424 is connected to a second shaft 426 and a third shaft 428 via a transfer case 420. Second shaft 426 is connected to a first jack screw 408, and third shaft 428 is connected to a third jack screw 412. Motor 418 is a second end of first shaft 424, is connected to a fourth shaft 432 and a fifth shaft 434 through a transfer case 422. Fourth shaft 432 is connected to drive a second jack screw 410 and fifth shaft 434 is connected to drive a fourth jack screw 414. When an operator actuates motor 418, the above-described "H-drive" transmission will ensure that the four jack screws 408, 412, 410, 414 will simultaneously turn at an identical speed. As a result, work platform 398 remains completely horizontal during vertical adjustment.

The jack screws 354 for vertically adjusting upper platform 348 with respect to mid-level platform 350 are controlled through a transmission that is identical in all relevant respects to that described above with reference to engine stand 346.

Figure 26E:
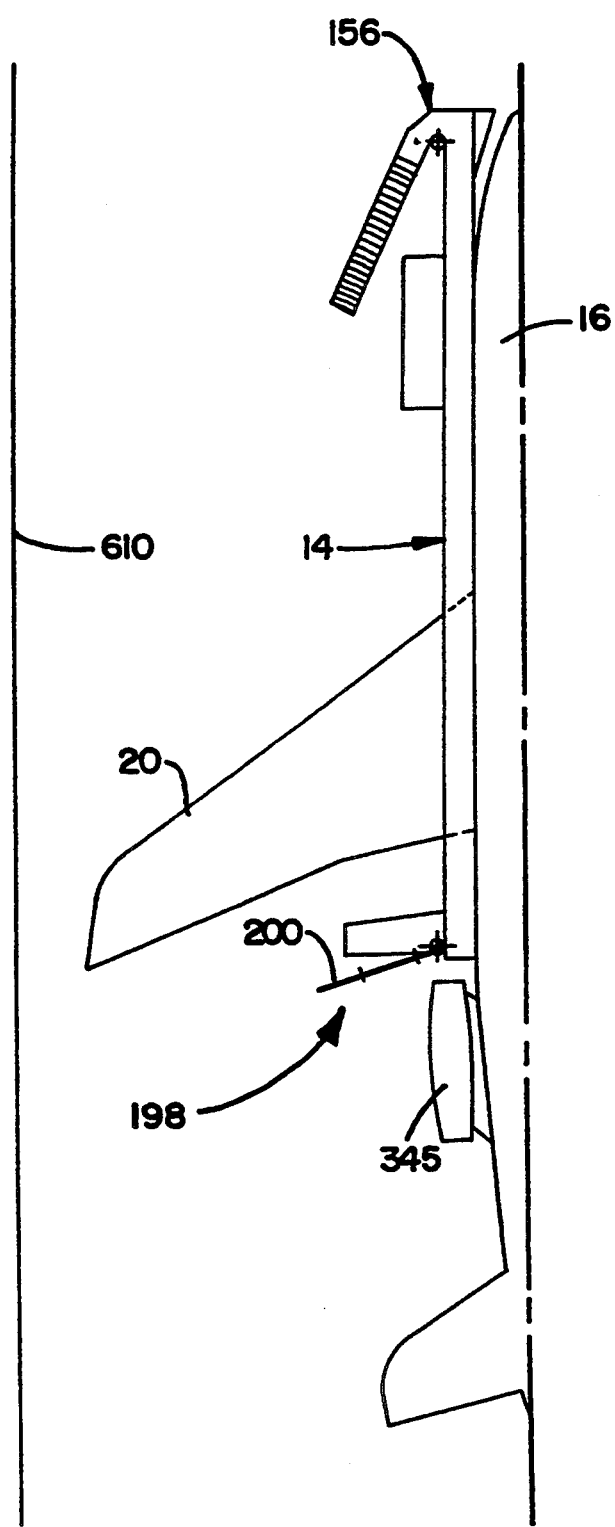

With reference to FIGS. 26(a)–26(e), the deployment and operation of a system 10 according to the invention will now be described. Referring first to FIG. 26(a), the second fuselage dock assembly 14 is initially positioned with its rearward end spaced outwardly along first rail 200 from the fuselage 16 of an aircraft 15 as aircraft 15 is backed into a maintenance hangar. The forward end of second fuselage dock assembly 14 is at this time positioned radially outwardly from fuselage 16 to the extent necessary to clear the left wing 20 of the aircraft as it is backed into the hangar. Rear trolley assembly 198 on the rearward end of assembly 14 must be spaced far enough outwardly from fuselage 16 so as to clear the tail section and the number one engine 345 of the aircraft 15. At this time, the first fuselage dock assembly 12 is symmetrically positioned on the opposite side of the aircraft.

Once the aircraft 15 is backed far enough into the maintenance hangar so as to assume the position with respect to tail stand arrangement 344 which is illustrated in FIG. 2, the fuselage dock assemblies 12, 14 are deployed into operative position adjacent fuselage 16.

To accomplish this, pneumatic cylinder 168 and forward trolley assembly 156 is retracted, thereby lifting small wheels 162 so that forward trolley assembly 156 rests upon the first and second large wheels 158, 160. Power is then supplied to motor 186 to drive the second large wheels 160. Since first large wheel 158 is slightly inclined with respect to second large wheel 160, so forward trolley assembly 156 negotiates a radially curved path. As a result, the forward end of second fuselage dock assembly 14 negotiates a curved path to the position which is illustrated in FIG. 26(b), while the rearward end thereof stays relatively stationary. Pneumatic cylinder 168 is then extended, to re-deploy the small wheels 162 on forward trolley assembly 156. At this point, motor 214 and rear trolley assembly 198 is actuated to move the rearward end of second fuselage dock assembly 14 to the position which is illustrated in FIG. 26(c). During such movement, the forward trolley assembly 156 slides longitudinally forward on small wheels 162. Pneumatic cylinder 168 is then again retracted, and motor 186 is actuated to move the forward end of fuselage dock assembly 14 to the position illustrated in FIG. 26(d), immediately adjacent the outer surface of fuselage 16. The rear end of assembly 14 is then moved by rear trolley assembly 198 to its final inward position adjacent fuselage 16, as shown in FIG. 26(e).

Simultaneously or sequentially, the first fuselage dock assembly 12 may be simultaneously deployed on the opposite side of fuselage 16.

Once fuselage dock assemblies 12, 14 are in position, normal maintenance may be performed on the aircraft 15. Adjustable work platform 64 may be raised or lowered to gain access to a desired port or entryway on aircraft 15. Upper tail platform 348 may likewise be raised or lowered to correspond to the outer dimensions of the vertical tail section 343 of aircraft 15. The Number 1 and 3 engine stands 346 may likewise be adjusted vertically to service the Number 1 and 3 engines 345, 349 on the opposite sides of aircraft 15. The height and elevation of walkway section 28 may be adjusted to correspond to the elevation and inclination of fuselage 16. It should be noted that the entire assembly could be lowered to gain access to the landing gear of the aircraft as well.

While the fuselage dock assemblies 12, 14 are deployed next to fuselage 16, the nose-engaging sections 52 may be extended or retracted to correspond to the length of aircraft 15. To adjust the degree of extension of section 52, lever 264 is moved to the downward position, thereby releasing brake pad 262 from the lower surface of I-beam track 250. The entire assembly 52 is then manually pushed or pulled to the selected position, upon which time lever 264 is again moved to its upward position, as shown in FIG. 12.

Once the desired maintenance has been performed on aircraft 15, fuselage dock assemblies 12, 14 are withdrawn from their operative position with respect to fuselage 16, by repeating, in reverse, the incremental movements which have previously been discussed with reference to FIGS. 26(a)–26(e).

Figure 27:
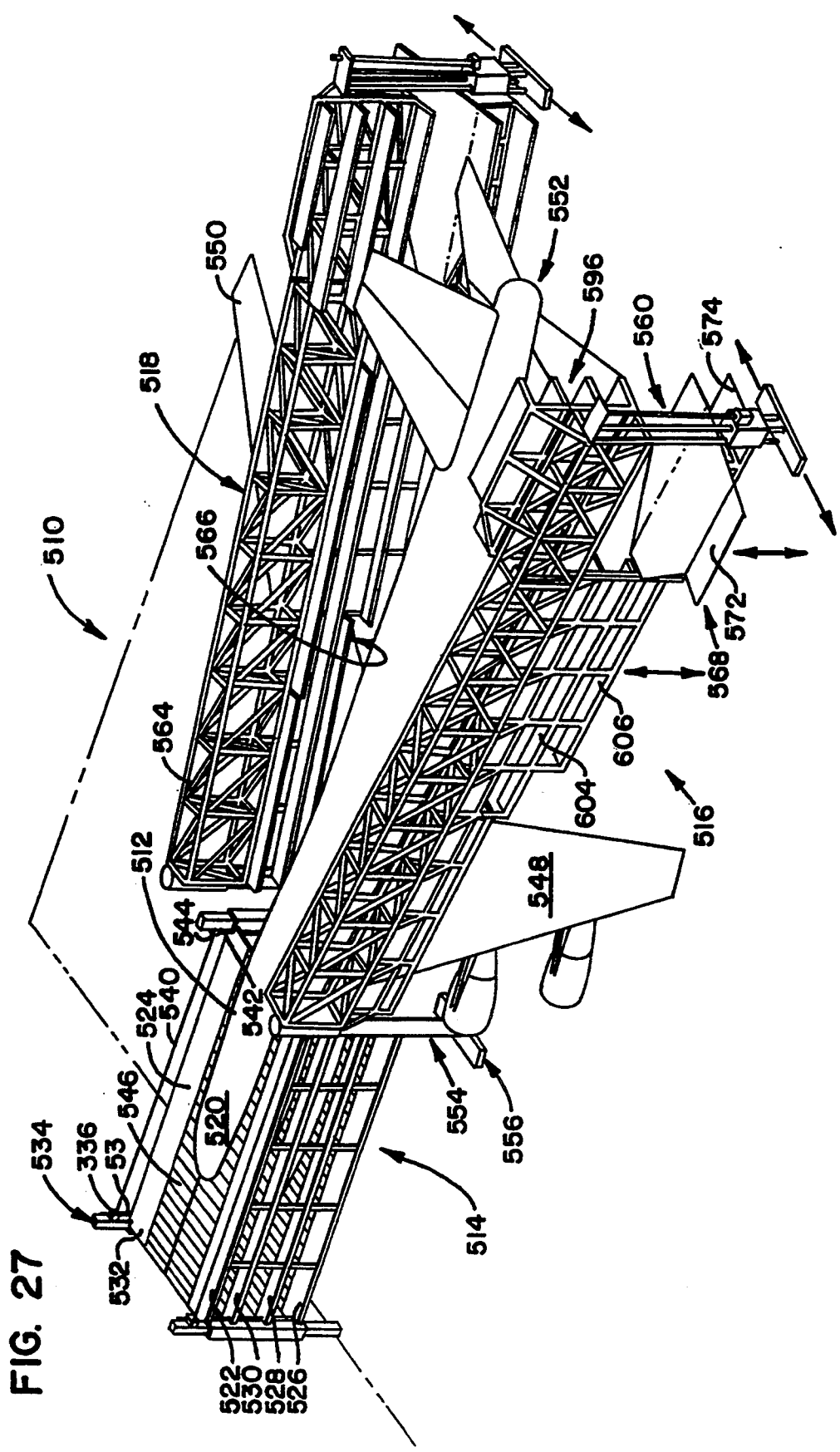
FIG. 27 is a perspective view of a facility constructed according to a second embodiment of the invention.
Figure 28:
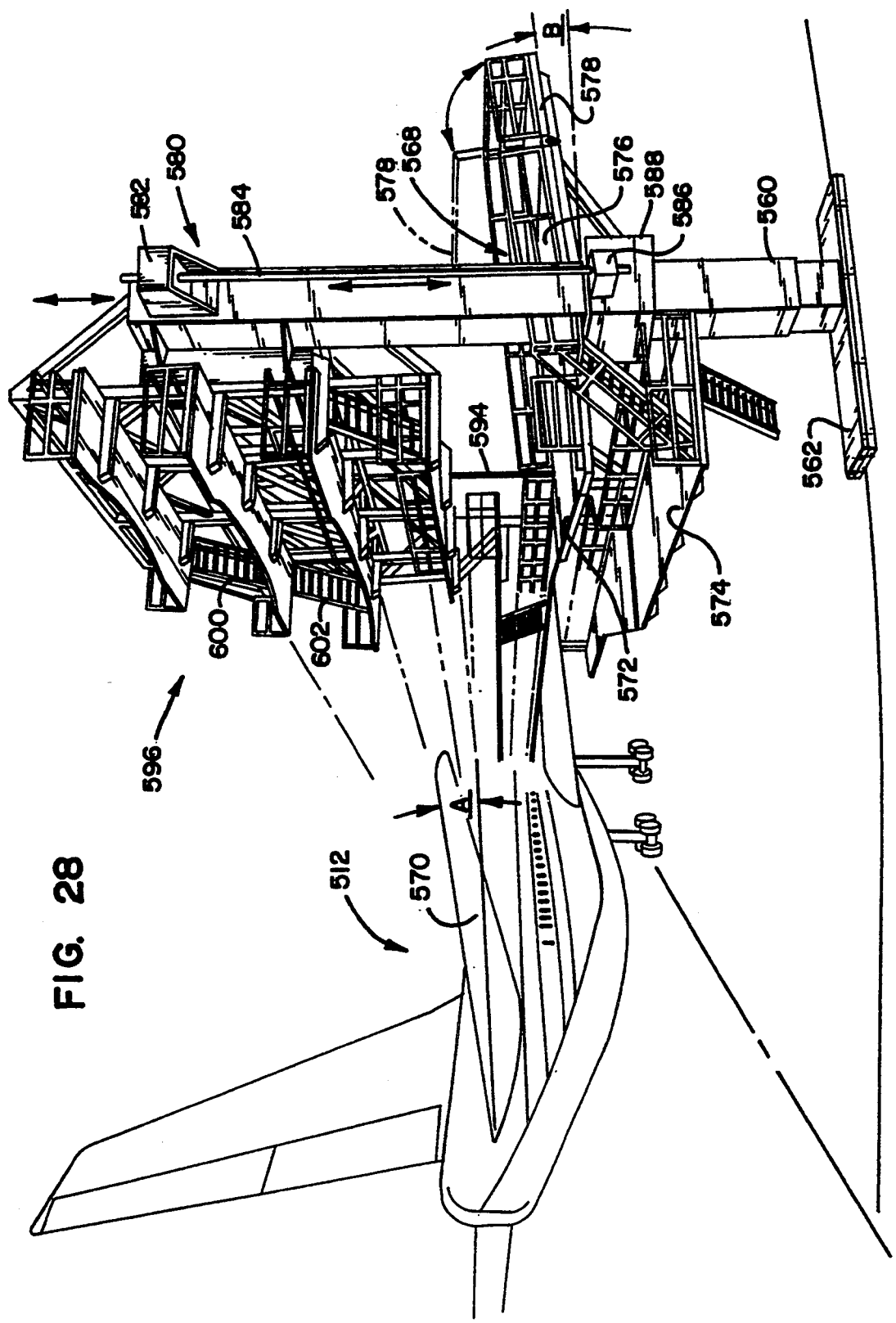
FIG. 28 is a rear perspective view of the right side dock assembly in the embodiment of the invention depicted in FIG. 27.
Figure 29:
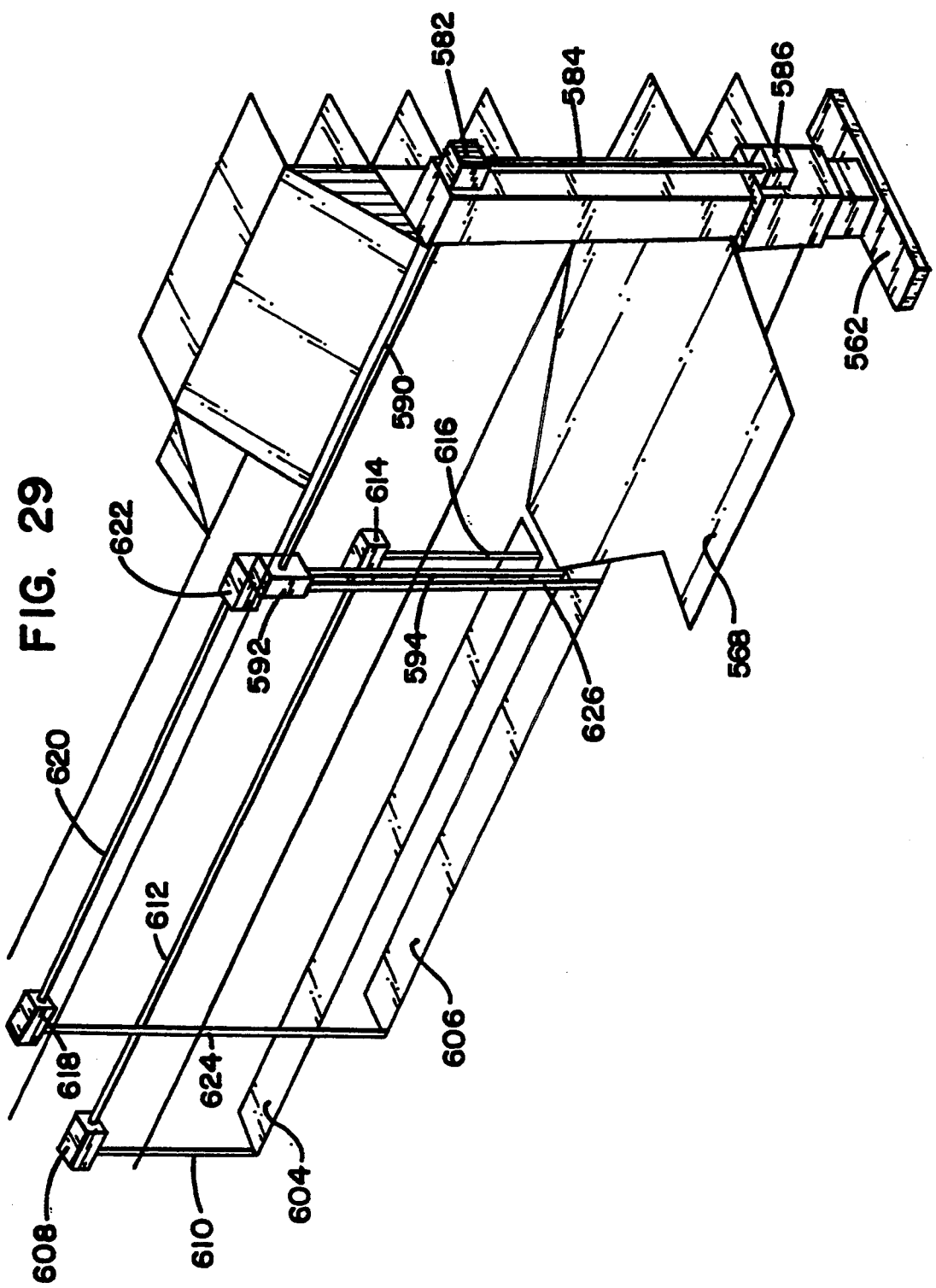
FIG. 29 is a schematic depiction of three different mechanical drive systems in the embodiment depicted in FIGS. 27 and 28.

A system 510 constructed according to a second, preferred embodiment of the invention is depicted in FIGS. 27–29. As may be seen in FIG. 27, system 510 is specifically designed to be used for servicing and maintaining a Boeing 747 series aircraft, although aspects of the system 510 may, of course, be used during the maintenance of other types of aircraft as well.

Referring to FIG. 27, system 510 includes a nose docking assembly 514 having a left side 522 and a right side 524, a left side docking assembly 516 and a right side docking assembly 518. The left side docking assembly 516 is identical to the right side docking assembly 518, although symmetrically opposite thereto with the exception that first and second adjustable walkways 604, 606 (discussed below) can be omitted or made nonadjustable on one of the units if that side of the aircraft does not contain a cargo door. The details of construction of the docking assemblies 516, 518 are described in greater detail below.

The left side unit 522 of the nose docking assembly 514 is constructed as a separate unit from the right side unit 524, and is identical in construction to the right side unit 524, although it is symmetrically opposite to the right side unit 524 in its orientation. Both left side unit 522 and right side unit 524 include plurality of vertically spaced platform levels upon which maintenance personnel and equipment may be supported. In the preferred embodiment, those constitute a first lower level 526, a second level 528, a third level 530 and a fourth, uppermost level 532. Slide boards 546 are provided on the inner edges of the various levels 526, 528, 530, 532 for permitting lateral adjustment of the inside edge of the respective platform to conform to the outer surface of a nose portion 520 of the aircraft 512. Slide boards 546 are substantially identical in construction to the slide beards described with reference to the previous embodiment, although they may be provided with the locking feature described in reference to FIG. 30 below.

Both the left side unit 522 and the right side unit 524 of the nose docking assembly 514 are further provided with a drive system 534 for vertically adjusting the units 522, 524 so that maintenance personnel can gain access to a desired area of the nose section 520 during servicing. Each vertical drive system 534 preferably includes an electric motor 536 which is connected to drive a first jack screw 538 and, via a transfer shaft 540 and a transfer case 544, a second jack screw 542. At least one of the four levels 526, 528, 530, 532 includes a pair of threaded plates for receiving the respective jack screws 538, 542. When motor 536 turns the jack screws 538, 542, the respective unit 522, 524 will rise or fall with respect to the aircraft 512, depending upon the direction of rotation of motor 536. Preferably, each unit 522, 524 is supported by a pair of outer columns having a sleeve mounted thereover which is secured to the unit 522, 524. As a result, the unit 522,524 is vertically adjustable with respect to the support column, and thus to the aircraft 512. The columns will provide support for the weight of the unit 522, 524 and resist the toppling moment which is generated by the weight of the unit 522, 524 and any persons and material thereon. The operation of nose docking assembly 514 in conjunction with the overall operation of the system is discussed in greater detail below.

Referring again to FIG. 27, the left and right side docking assemblies 516, 518 are each constructed in a bridge-like configuration, spanning the left and right wings 548, 550 of the aircraft 512, respectively. Each of the docking assemblies 516, 518 is supported by a first column 554 mounted on a forward trolley unit 556, and a second column 560 mounted on a rear trolley unit 562. Forward trolley unit 556 is identical in construction to the rear trolley unit 198 disclosed in the previous embodiment, and is mounted so as to be constrained to ride on a floor mounted rail track (not shown). The rail track and the assemblies 516, 518 in general are oriented as depicted in FIG. 26a–26e, except for the direction in which aircraft 512 is pointed. Rear trolley unit 562 is identical in construction to the forward trolley unit 156 disclosed in the first embodiment of the invention, and has wheels aligned to follow a broad, circular path, as is shown in FIG. 27. Like the columns in the previously disclosed embodiment, first column 554 and second column 560 are extendable to raise or lower the respective docking assembly 516, 518 with respect to the aircraft 512.

As is best shown in FIG. 27, a structural space frame 564 is provided which extends longitudinally between the first column 554 and the second column 560 on each of the docking assemblies 516, 518. Space frame 564, like the box like beam 38 in the previous embodiment, is constructed to stiffen the docking assembly 516, 518 against torsional or bending deformation in response to torsional moments or weight which may be placed on a walkway system 566 of the assembly 516, 518.

Walkway system 566 includes a number of platforms which are affixed with respect to the structural space frame 564, for supporting personnel and equipment during cleaning and maintenance of the aircraft 512. Walkway system 566 further includes a plurality of vertically spaced walkways 596 for gaining access to the vertical stabilizer 598 of aircraft 512, an adjustable platform 568 for gaining access to a horizontal stabilizer 570 of the aircraft 512, and first and second adjustable walkways 604, 606. Stairs 600, 602 are provided for gaining access to the vertically spaced walkways 596, as may best be seen in FIG. 28.

The vertically adjustable horizontal stabilizer platform 568 is best shown in FIG. 28. Platform 568 includes an upper level 572, a lower level 574 and a fixed staircase for moving between the levels 572, 574. According to one particularly advantageous feature of the invention, upper level 572 has an inclined surface portion 576 which is inclined at an angle B, which is substantially commensurate with an angle A at which the horizontal stabilizer fin 570 is inclined at with respect to the horizontal. When platform 568 is positioned immediately beneath the horizontal stabilizer fin 570, this allows maintenance personnel convenient access to the horizontal stabilizer fin 570 along its entire length. As shown in FIG. 28, the distal end of the inclined surface portion 576 of platform 568 includes a portion 578 which is foldable upon itself to a storage position. This reduces the width of the dock assemblies 516, 518 during storage, which permits deployment of the system 510 in a smaller hanger or maintenance building than would otherwise be possible.

Horizontal stabilizer platform 568 is vertically adjustable upwardly or downwardly by means of a vertical adjustment drive system 580. Drive system 580 includes a motor 582 which drives a first jack screw 584 and another jack screw 594 via a transfer shaft 590 and a transfer case 614, as is shown schematically in FIG. 29. Jack screw 584 is threaded into a plate 586 which is welded onto a sleeve 588, as is shown in FIG. 28. Sleeve 588 is provided with internal bearings which allow it to move vertically with respect to second column 560. Horizontal stabilizer platform 568 is welded to sleeve 588, and includes a second threaded plate through which the second jack screw 594 is threaded. When motor 582 turns in a first direction, jack screws 584, 594 are simultaneously turned in the same direction and at the same rate, causing the horizontal stabilizer platform 568 to be raised or lowered. Platform 568 will, of course, be adjusted in an opposite direction when motor 582 is turned in a reversed direction.

Referring to FIGS. 27 and 29, first adjustable walkway 604 is vertically adjustable so as to be positionable adjacent to the upper level 572 of horizontal stabilizer platform 568. A drive system for effecting vertical adjustment of first adjustable walkway 604 is schematically depicted in FIG. 29, and includes a motor/transfer case 608 which drives a first jack screw 610 and a second jack screw 616 via a transfer shaft 612 and a transfer case 614. First adjustable walkway 604 is provided with a pair of threaded plates for threadedly receiving the first and second jack screws 610, 616, respectively. When motor/transfer case turns in a first direction, adjustable walkway 604 is raised. When motor/transfer case 608 turns in an opposite direction, the first adjustable walkway 602 is lowered. Similarly, second adjustable walkway 606 is vertically adjustable through a drive system which includes a motor/transfer case 618, a first jack screw 624 and a second jack screw 626 which is driven by motor/transfer case 618 via a transfer shaft 620 and a transfer case 622. When motor/transfer case 618 turns in a first direction, jack screws 624, 626, which are threaded through respective threaded plates in the second adjustable walkway 606, operate to raise the second adjustable walkway. When motor/transfer case 618 turns in an opposite direction, second adjustable walkway 606 is raised. Second adjustable walkway 606 is oriented so that it can be aligned with the lower level 574 of horizontal stabilizer platform 568, as is perhaps best illustrated in FIG. 28.

In operation, dock assemblies 516, 518 are first positioned in a fully withdrawn orientation, similar to that which is depicted in FIG. 26A, and the slide boards in the nose docking assembly 514 are fully retracted. At this time, the first and second columns 554, 560 on the dock assemblies 516, 518 are fully extended, and the horizontal stabilizer platform 568, first adjustable walkway 604 and second adjustable walkway 606 are all positioned in their highest possible vertical position. This allows the left and right wings 548, 550 of the aircraft 512 to pass beneath dock assemblies 516, 518 as nose section 520 is positioned between the left and right sides 522, 524 of the nose docking assembly 514. Once nose section 520 is so positioned, the left and right sides 522, 524 of nose docking assembly 514 are vertically adjusted to the desired position, and the slide boards 546 are positioned to create working surfaces which are complementary in shape to the nose section 520 of the aircraft 512.

At this point, the dock assemblies 516, 518 are moved on the respective rear trolley units 562 to a position more adjacent to the fuselage of the aircraft 512, in a manner that is identical to that depicted in FIG. 26B. Horizontal stabilizer platform 568, first adjustable walkway 604 and second adjustable walkway 606 are adjusted to a more normal operating position at this point. Then, the forward trolley units 556 of the dock assemblies 516, 518 are moved on the respective rail tracks to a position which is more closely adjacent the fuselage, as depicted in FIG. 26C. The assemblies 516, 518 are then moved on rear trolley unit 562 so that horizontal stabilizer platform 568 is positioned beneath the horizontal fin 570 of the aircraft 512. This step is schematically depicted in FIG. 26D. As a final adjustment step, each of the dock assemblies 516, 518 are moved on the forward trolley units 556 to a position which is immediately adjacent the fuselage 512, as is shown schematically in FIG. 26E. At this point, horizontal stabilizer platform 568 can be adjusted to a vertical position which is the most convenient to maintenance personnel who will be working on the horizontal stabilizer fin 570. First and second adjustable walkways 604, 606 can be likewise adjusted. In some aircraft, a cargo door is provided in the fuselage between the level of the first adjustable walkway 604 and the second adjustable walkway 606. In such aircraft, it may be necessary to adjust the positions of the respective walkways 604, 606 to open the cargo door, and to readjust the positions of the walkways 604, 606 to achieve the most convenient operating position. At this point, maintenance can be quickly and efficiently performed on the aircraft 512. To withdraw the aircraft 512 from the system 510, the above process is reversed.

Figure 30:
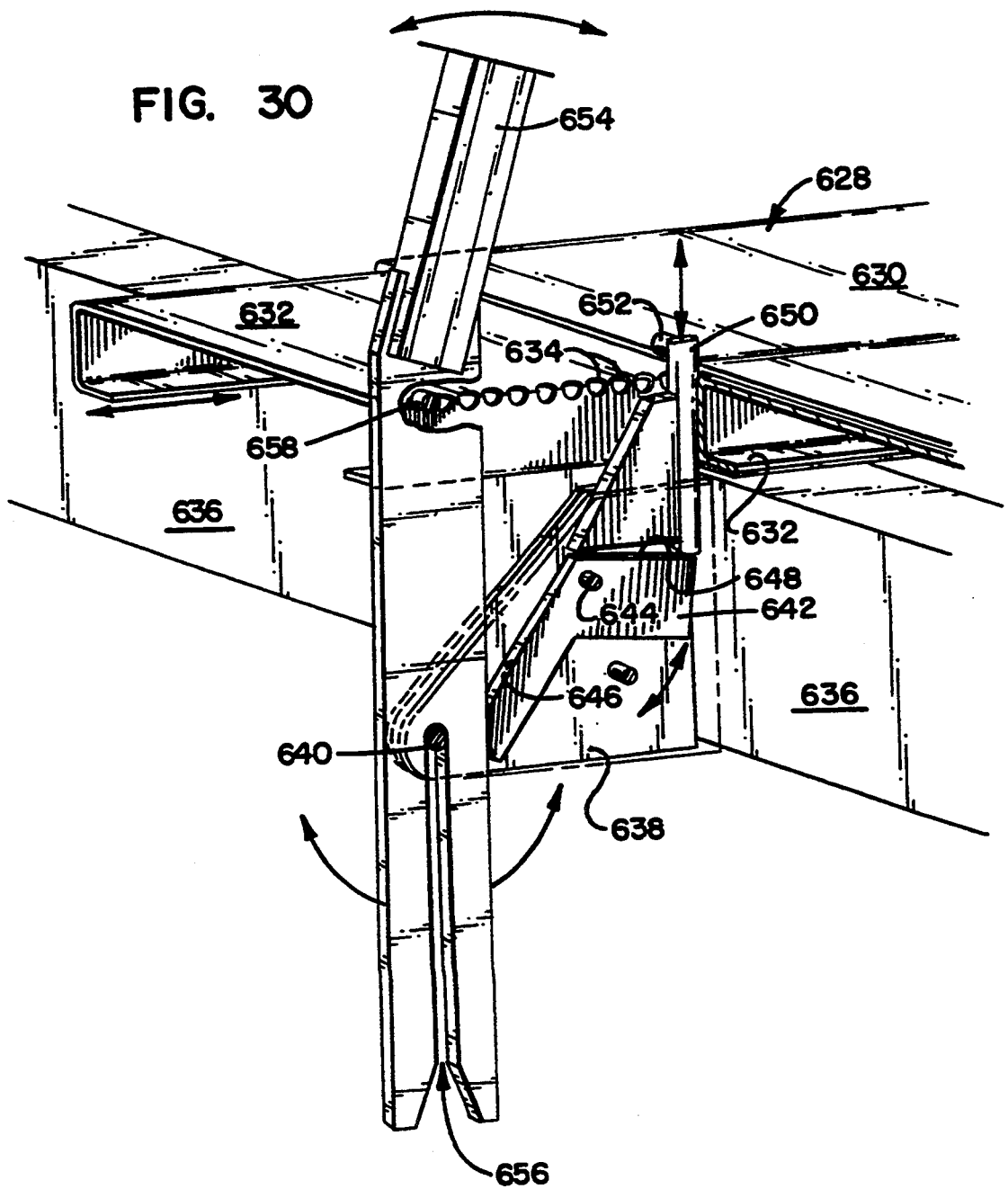
FIG. 30 is a fragmentary perspective view of a slide board locking system which can be utilized in either of the disclosed embodiments.

Referring now to FIG. 30, a system for locking a slide board according to the invention in place will now be described. A platform 628 is formed by a number of steel members which operate as housings 630 for a plurality of slide boards 632. Slide board 632 could be used in place of any of the slide boards which are previously disclosed for conforming a work surface to the fuselage of an aircraft or another object. Slide boards 632 have a number of notches 634 defined in an upper edge thereof, as may be seen in FIG. 30.

A wall or housing 638 is attached to a structural plate 636 which is attached beneath platform 628. A pin 640 is mounted to wall 638, as is a cam plate 642 which is pivotable about a pivot pin 644 attached to wall 638. Cam plate 642 includes a cam surface 646 and an upper surface 648 which is in contact with a bottom end of a locking pin 650. Locking pin 650 is mounted so as to be freely slidable upwardly and downwardly, and includes a projection 652 which is sized to fit in any of the notches 634. As may be seen in FIG. 30, a lever 654 having a slot 656 defined longitudinally in a bottom end thereof is also part of the locking system.

When lever 654 is not inserted so that its slot 656 fits over pin 640, locking pin 650 will settle so that its projection 652 is in one of the notches 634, thereby locking the slide board 632 into a fixed position. Lever 654 is generally stored in a remote location, except when it is desired to advance or retract slide board 632. To advance a slide board 632, lever 634 is inserted downwardly between the slide boards so that slot 656 receives pin 640. As a result, lever 654 will contact cam surface 646, rotating cam plate 642 in a counterclockwise direction. This causes the upper surface 648 of cam plate 642 to cam locking pin 650 upwardly, thereby removing projections 652 from notch 634. At this point in time, an operator will push lever 654 in a counterclockwise direction, causing an ear 658 on a rear surface of lever 654 to engage one of the notches 634 in slide board 632. As a result, slide board 632 will advance forwardly out of housing 630. At the end of such a stroke, an operator may slightly withdraw lever 634 and reengage ear 658 with a notch 634 which is further to the rear of the slide board 632. Slide board 632 may then be advanced further in similar fashion. When slide board 632 is in its desired position, lever 654 is removed. Locking pin 650 will then settle into one of the notches, locking slide board 632 in position.

When slide board 632 is to be withdrawn, lever 654 is again inserted so that slot 656 receives pin 640. Locking pin 650 is thus pushed upwardly, removing projection 652 from notch 634. Ear 658 is then positioned in a forward notch 634, and lever 654 is pulled backwardly in a clockwise direction to retract slide board 632 into the housing 630. This process can be repeated as many times as is necessary.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed:

1. A docking facility for aircraft maintenance and repair, comprising:

a floor;

a guide rail that is fixed with respect to said floor;

a first column supported by said floor;

a second column supported by said floor; and a walkway system supported at a first location by said first column and at a second location by said second column, said walkway being constructed and arranged so as to be positionable to extend lengthwise along the fuselage of an aircraft to provide access to the fuselage for maintenance and repair purposes;

wherein at least one of said first and second columns is movable for moving said walkway system to a retracted position away from an intended position of an aircraft while an aircraft is being moved into or out of docking position, said at least one movable column comprising means for movably mounting said one column for movement along said rail, said mounting means engaging said rail in a manner so as to prevent tipping of said movable column during movement, whereby docking of an aircraft of the facility can be accomplished safely and effectively.

2. A facility according to claim 1, wherein both said first and second columns are movable for moving said walkway system to a retracted position while an aircraft is being moved into or out of docking position.

3. A facility according to claim 1, wherein said mounting means comprises a trolley assembly for riding on said rail, said trolley comprising at least one rail clamp for engaging an underside of said rail when said walkway system begins to tip.

4. A facility according to claim 3, wherein said trolley comprises at least two wheels that ride on said rail at the same time, thereby providing stability to said mounting means.

5. A facility according to claim 1, wherein said other of said first and second columns that does not include said mounting means comprises a trolley having wheels thereon for permitting said other column to move over said floor.

6. A facility according to claim 5, wherein said wheels are oriented so that said trolley will tend to move over said floor in an arcuate motion.

7. A docking facility for aircraft maintenance and repair, comprising:

a pair of oppositely facing docking systems, said docking systems being positioned on opposite respective sides of an aircraft for maintenance and repair purposes, each of said docking systems comprising:

a first column;

a second column;

first mounting means for mounting said first column for ground-supported pivotal movement about said second column;

second ground-supported mounting means for mounting said second column for movement along a path toward and away from said other, oppositely facing docking system; and a walkway system supported at a first location by said first column and at a second location by said second column, said walkway being constructed and arranged so as to be positionable to extend lengthwise along the fuselage of an aircraft, whereby said systems may be moved away from each other during aircraft docking by moving the respective second columns apart along said respective paths and then moving the first columns apart by pivoting the first columns about the second columns.

8. A facility according to claim 7, wherein said second mounting means comprises anti-tipping means for preventing said second column and, thus, said walkway from tipping during movement.

9. A facility according to claim 8, wherein said anti-tipping means comprises means for engaging a stationary guide rail when tipping begins to occur.

10. A method of performing maintenance or repairs on a large aircraft, comprising:

(a) providing first and second oppositely facing docking systems that each include a first floor-supported column, a second floor-supported column; and a walkway system supported at a first location by the first column and at a second location by the second column, the walkway being constructed and arranged so as to be positionable to extend lengthwise along the fuselage of an aircraft;

(b) moving the first column of the first system along a path away from the first column of the second system;

(c) moving the second column of the first system away from the second column of the second system;

(d) moving an aircraft into the space between the docking systems that was created in steps (b) and (c);

(e) moving the second column of the first system toward the second column of the second system to bring the respective second portions of the systems into a position that is adjacent to the fuselage of the aircraft;

(f) moving the first column of the first system along a path toward the first column of the second system to bring the respective first portions of the systems into a position that is adjacent to the fuselage of the aircraft; and (g) performing a maintenance or repair procedure on the aircraft while working from the respective walkways on the systems.

11. A method according to claim 10, wherein the movement along the path in steps (b) and (f) comprises a linear motion.

12. A method according to claim 10, wherein the movement in steps (c) and (e) is a pivotal motion about said first column of said first system.

* * * * *